United States Patent
Marotta et al.

(10) Patent No.: US 7,160,209 B2
(45) Date of Patent: Jan. 9, 2007

(54) MULTILAYER GOLF BALL

(75) Inventors: Edigio Marotta, Bryon, TX (US);
George Wallace, Clemson, SC (US);
Jim Mann, Walhalla, SC (US);
Douglas Winfield, Knoxville, TN (US)

(73) Assignee: TaylorMade-Adidas Golf Company

( * ) Notice: Subject to any disclaimer, the term of this patent is extended or adjusted under 35 U.S.C. 154(b) by 0 days.

(21) Appl. No.: 10/922,986

(22) Filed: Aug. 23, 2004

(65) Prior Publication Data

US 2005/0113187 A1   May 26, 2005

Related U.S. Application Data

(60) Provisional application No. 60/497,429, filed on Aug. 22, 2003.

(51) Int. Cl.
*A63B 37/12* (2006.01)
(52) U.S. Cl. ..................... 473/378
(58) Field of Classification Search ........... 473/378
See application file for complete search history.

(56) References Cited

U.S. PATENT DOCUMENTS

| | | | |
|---|---|---|---|
| 4,142,727 A | 3/1979 | Shaw et al. | |
| 4,679,795 A | 7/1987 | Melvin et al. | |
| 4,884,814 A | 12/1989 | Sullivan | |
| 4,911,451 A | 3/1990 | Sullivan et al. | |
| 4,986,545 A | 1/1991 | Sullivan | |
| 5,098,105 A | 3/1992 | Sullivan | |
| 5,187,013 A | 2/1993 | Sullivan | |
| 5,306,760 A | 4/1994 | Sullivan | |
| 5,312,857 A | 5/1994 | Sullivan | |
| 5,334,673 A | 8/1994 | Wu | |
| 5,377,989 A | 1/1995 | Machin | |
| 5,908,359 A * | 6/1999 | Shimosaka et al. | 473/384 |
| 5,957,786 A | 9/1999 | Aoyama | |
| 6,117,024 A * | 9/2000 | Dewanjee | 473/351 |
| 6,595,873 B1 * | 7/2003 | Sullivan | 473/374 |
| 6,616,550 B1 | 9/2003 | Nesbitt et al. | |
| 6,638,185 B1 * | 10/2003 | Kennedy et al. | 473/374 |
| 6,645,088 B1 | 11/2003 | Wu et al. | |
| 6,663,508 B1 | 12/2003 | Keller et al. | |
| 6,719,646 B1 | 4/2004 | Calabria et al. | |
| 6,743,847 B1 | 6/2004 | Sullivan et al. | |
| 2004/0132551 A1 * | 7/2004 | Aoyama et al. | 473/378 |

* cited by examiner

*Primary Examiner*—Raeann Gorden
(74) *Attorney, Agent, or Firm*—Lorusso & Associates

(57) ABSTRACT

A multilayer golf ball with a solid center diameter in the range of about 1.40 to 1.52 inches, a ionomeric polymer mantle with a thickness of about 0.050 inches, and a hardness in the range of 50 to 55 Shore D and a polyurethane having a cover hardness in the range of 50 to 60 Shore D with a thickness of about 0.050 inches. The compression may be 50–60 PGA. The compression of the core may be 70–80 PGA. The compression of the above exemplary embodiment of the ball may be 80–90 PGA. A ball having such characteristics exhibits superior distance performance without compromising shot-making feel.

15 Claims, 4 Drawing Sheets

MULTILAYER GOLF BALL

BACKGROUND OF THE INVENTION

1. Field of Invention

The present invention is directed to golf balls, and more particularly to a multilayer golf ball having a center compression, core diameter, mantle hardness and cover hardness that provides superior playability capabilities with respect to softness and spin without sacrificing superior distance capabilities.

2. Description of Related Art

There are a number of physical properties that affect the performe of a golf ball. The core of the golf ball is the source of the ball's energy. Among other things, the core affects the ball's "feel" and its initial velocity. The "feel" is the overall sensation transmitted to the golfer through the golf ball after striking a ball. The initial velocity is the velocity at which the golf ball travels when first struck by the golf club. The initial velocity, together with the ball's trajectory, determine how far a shot will travel.

Until the late 1960's most golf balls were constructed as three-piece wound balls. In the three-piece wound ball, a solid or liquid-filled center is wound with rubber windings to form a core, which is then enclosed within a cover of compounds based on natural (balata or guttta percha) or synthetic transpolyisoprene. During the manufacturing process, after the liquid-filled center is formed, it is frozen to make it as hard as possible so that it will retain its spherical shape while the rubber thread is wrapped around it.

These three-piece wound balls were known and are still known to provide acceptable flight distance and soft feel. Additionally, due to the relative softness of the balata cover, skilled golfers are able to impart various spins on the ball in order to control the ball's flight path (e.g. "fade" or "draw") and check characteristics upon landing on a green.

In an attempt to produce golf balls with the feel of a traditional three-piece wound golf ball various approaches were taken to duplicate the properties of balata without the materials inherent shortcomings of poor cut and shear resistance and high cost of manufacture. The first attempt at duplicating balata covers was through the use of low modulus ionomers.

These low modulus ionomer polymers produced covers with properties similar to balata but also with the inherent shortcomings of poor cut and shear resistance. Additionally these low modulus ionomer covers tended to go "out of round" quicker than traditional wound three-piece balls with balata covers. The low modulus ionomer covers were improved by blending with higher modulus ionomers but at the expense of loss of feel.

Another approach to providing a golf cover with the properties of balata without its shortcomings was described in U.S. Pat. No. 5,334,673 (the '673 patent) assigned to the Acushnet Company. The '673 patent discloses a cover composition comprising a diisocyanate, a polyol and a slow reacting polyamine curing agent.

With the advent of new materials developed through advances and experimentation in polymer chemistry, two-piece golf balls were developed. The primary difference between a two-piece golf ball and a three-piece golf ball is the elimination of the rubber thread windings found in the three-piece balls. A relatively large solid core in a two-piece ball takes the place of the relatively small center and thread windings of a three-piece ball core having the same overall diameter. With the elimination of the thread windings, there is no need to freeze the core during the manufacturing process of the two-piece golf ball.

Two-piece balls have proven to be more durable than three-piece balls when repeatedly struck with golf clubs and more durable when exposed to a variety of environmental conditions. An example of these environmental conditions is the high temperature commonly experienced in an automobile trunk. In addition, two-piece balls are typically less expensive to manufacture than the three-piece wound balls. However, two-piece balls are, in general, considered to have inferior characteristics of feel and workability when compared to three-piece balls. Generally and historically, two-piece balls use harder cover materials for increased durability. The "hardness" of a golf ball can affect the "feel" of a ball and the sound or "click" produced at contact. "Feel" is determined as the deformation (i.e. compression) of the ball under various load conditions applied across the ball's diameter. Generally, the lower the compression value, the softer the "feel." The cores in two-piece golf balls are typically larger than the centers in three-piece golf balls.

In contrast, traditional three-piece golf balls with their smaller centers historically use softer cover materials. These softer cover materials result in a lower initial velocity when compared to two-piece golf balls. However, this difference in the initial velocity may be somewhat made up by the windings in the traditional three-piece golf ball.

Ball flight performance is also influenced by dimples formed on the cover. Dimples provide aerodynamic properties that influence flight characteristics. The dimples on a golf ball are important in reducing drag and increasing lift. Drag is the air resistance that acts on the golf ball in the opposite direction from the balls flight direction. As the ball travels through the air, the air surrounding the ball has different velocities and, thus, different pressures. The air exerts maximum pressure at the stagnation point on the front of the ball. The air then flows over the sides of the ball and has increased velocity and reduced pressure. At some point it separates from the surface of the ball, leaving a large turbulent flow area called the wake that has low pressure. The difference in the high pressure in front of the ball and the low pressure behind the ball slows the ball down. This is a primary source of drag for a golf ball.

The dimples on the ball create a turbulent boundary layer around the ball, i.e., the air in a thin layer adjacent to the ball flows in a turbulent manner. The turbulence energizes the boundary layer and helps it stay attached further around the ball to reduce the area of the wake. This greatly increases the pressure behind the ball and substantially reduces the drag.

Lift is the upward force on the ball that is created from a difference in pressure on the top of the ball to the bottom of the ball. The difference in pressure is created by a warpage in the air flow resulting from the ball's back spin. Due to the back spin, the top of the ball moves with the air flow, which delays the separation to a point further aft. Conversely, the bottom of the ball moves against the air flow, moving the separation point forward. This asymmetrical separation creates an arch in the flow pattern, requiring the air over the top of the ball to move faster, and thus have lower pressure than the air underneath the ball. In the early to mid 1900's, almost every golf ball being made had 336 dimples arranged in some form of geometrically repeating pattern. Generally, these balls had about 60% of their outer surface covered by dimples. Over the latter part of the 1900's golf balls were designed with more and more dimples in order to increase surface coverage on the ball. For example, in 1983, Acushnet introduced the TITLEIST 384, which had 384 dimples that were arranged in an icosahedral pattern. About 76% of this balls outer surface was covered with dimples.

A high degree of dimple coverage is beneficial to flight distance, but only if the dimples are of a reasonable size. Golf ball manufacturers have experimented over the years with many different dimple designs, including round, oval, truncated conical, hexagonal, etc. By varying the size, shape and volume of dimples, flight characteristics may be altered. In order to produce more desirable flight characteristics, ball designers have attempted to reduce the surface area on a ball between dimples. This surface area, commonly referred to as land area, can detrimentally effect ball performance. U.S. Pat. No. 4,142,727 to Shaw discloses a dimple pattern using between 240 to 480 dimples to achieve 50 to 60 percent dimple coverage. U.S. Pat. No. 5,957,786 to Aoyama discloses a golf ball dimple pattern based on an icosahedron design. This pattern discloses the use of between 350 to 500 dimples to cover about 80% of the balls surface. As may be seen, dimple patterns and sizes have been widely varied in order to achieve the highest possible dimple coverage on the balls surface.

Most golf balls today use relatively small dimples in order to reduce the amount of land area on the ball surface, and it is not uncommon to have golf balls with over 400 dimples on the surface. However, the only way to increase the number of dimples on a ball is to increase the number of dimple cavities in the ball mold. It is difficult and costly to design and manufacture of molds having high numbers of dimples. Thus, it would be desirable to have a ball with a high percent dimple coverage using larger size and fewer number of dimples on the ball's surface thereby avoiding complex and costly high dimple configuration mold cavities.

Ball manufacturers are bound by regulations of the United States Golf Association (USGA) which control many characteristics of the ball, including the size and weight of the ball, the initial velocity of the ball when tested under specified conditions, the overall distance the ball travels when hit under specified test conditions, and the ball's aerodynamic symmetry. Under USGA regulations, the diameter of the ball cannot be less than 1.680 inches, the weight of the ball cannot be greater than 1.620 ounces avoirdupois, the initial velocity of the ball cannot be greater than 250 feet per second when tested under specified conditions (with a maximum tolerance of +2%), the driver distance cannot exceed 280 yards when tested under specified conditions (with a test tolerance of +6%), and the ball must perform the same aerodynamically regardless of orientation.

SUMMARY OF THE INVENTION

Therefore, in light of the above, and for other reasons that will become apparent when the invention is fully described, the present invention provides a multilayer golf ball that has a soft feel in combination with superior distance capabilities.

The present invention also enhances or optimizes the combination of center compression, center size, center composition, mantle size, mantle compression, mantle hardness, cover composition, cover hardness and dimple coverage to provide a multilayer golf ball, which travels great distances, and at the same time complies with USGA regulations.

The present invention also provides a multilayer golf ball having a synthetic cover material that produces the sound, feel, playability and flight performance qualities of balata covered golf balls.

The present invention provides a polyurethane cover formulation that produces the hardness and playability characteristics of a balata cover without compromising the durability of the cover.

The present invention provides an ionomer mantle formulation that includes a high specific gravity filler to produce desirable hardness and playability characteristics by moving the moment of inertia away from the center of the ball toward the periphery without compromising the durability of the cover.

The above and/or other advantages can be addressed or achieved individually and in combination, and it is not intended that the present invention be construed as requiring two or more of the objects to be combined unless expressly required by the claims attached hereto.

One exemplary embodiment of the present invention is a multilayer golf ball having a solid center, a synthetic ionomer resin mantle, and a polyurethane cover. For example, an exemplary embodiment of the golf ball of the present invention may have: a solid center with a diameter in the range of about 1.35 inches to about 1.51 inches; an ionomeric polymer mantle with a hardness in the range of about 50 Shore D to about 55 Shore D and a wall thickness of about 0.050 inches, and a polyurethane cover. This combination has been found to produce a ball with superior distance capabilities, which also satisfies USGA regulations. The use of such properties in an exemplary embodiment of the golf ball of the present invention is based on the recognition that it is the combination of the center compression, center composition, center size, mantle composition, mantle thickness, mantle hardness, cover composition, cover hardness and dimple configuration that will produce a ball that will travel the greatest distance without compromising shot-making feel.

The mantle material may be constructed from any moderately stiff material, for example, synthetic thermoplastic materials and blends thereof. Most notably these synthetic thermoplastic materials may be ionomeric resins. Ionomeric resins are polymers containing interchain ionic bonding. As is well known in the chemical arts, ionomeric resins are generally ionic copolymers of an olefin having from about two to about eight carbon atoms, such as ethylene and a metal salt of an unsaturated carboxylic acid, such as acrylic acid, methacrylic acid, or maleic acid. The pendent ionic groups in the ionomeric resins interact to form ion-rich aggregates contained in a non-polar polymer matrix. Metal ions, such as sodium, lithium, zinc or magnesium are used to neutralize some portion of the acidic groups in the copolymer.

The cover material may be constructed from a relatively stiff material, for example, polymeric materials. A cover material for an exemplary embodiment of the present invention may be a polyurethane having the durability of a high modulus ionomer with the feel and playability of balata. Polyurethanes are formed when a polyisocyanate reacts with a polyol and/or a polyamine. This forms a tough flexible polymer which is resistant to cuts and abrasions but is relatively soft like a balata material.

The center may be constructed from any relatively stiff material. The material incorporated into the center may be one that allows the ball to satisfy the USGA regulations for weight and initial velocity under prescribed test conditions. In one exemplary embodiment a solid center made of rubber with a diameter between about 1.42 inches and about 1.51 inches is used.

The above and still further objects, features and advantages of the present invention will become apparent upon consideration of the following descriptions and descriptive figures of specific exemplary embodiments thereof. While these descriptions go into specific details of the invention, it should be understood that variations may and do exist and would be apparent to those skilled in the art based on the descriptions herein.

DETAILED DESCRIPTION OF THE PREFERRED EMBODIMENT

Figure 1:
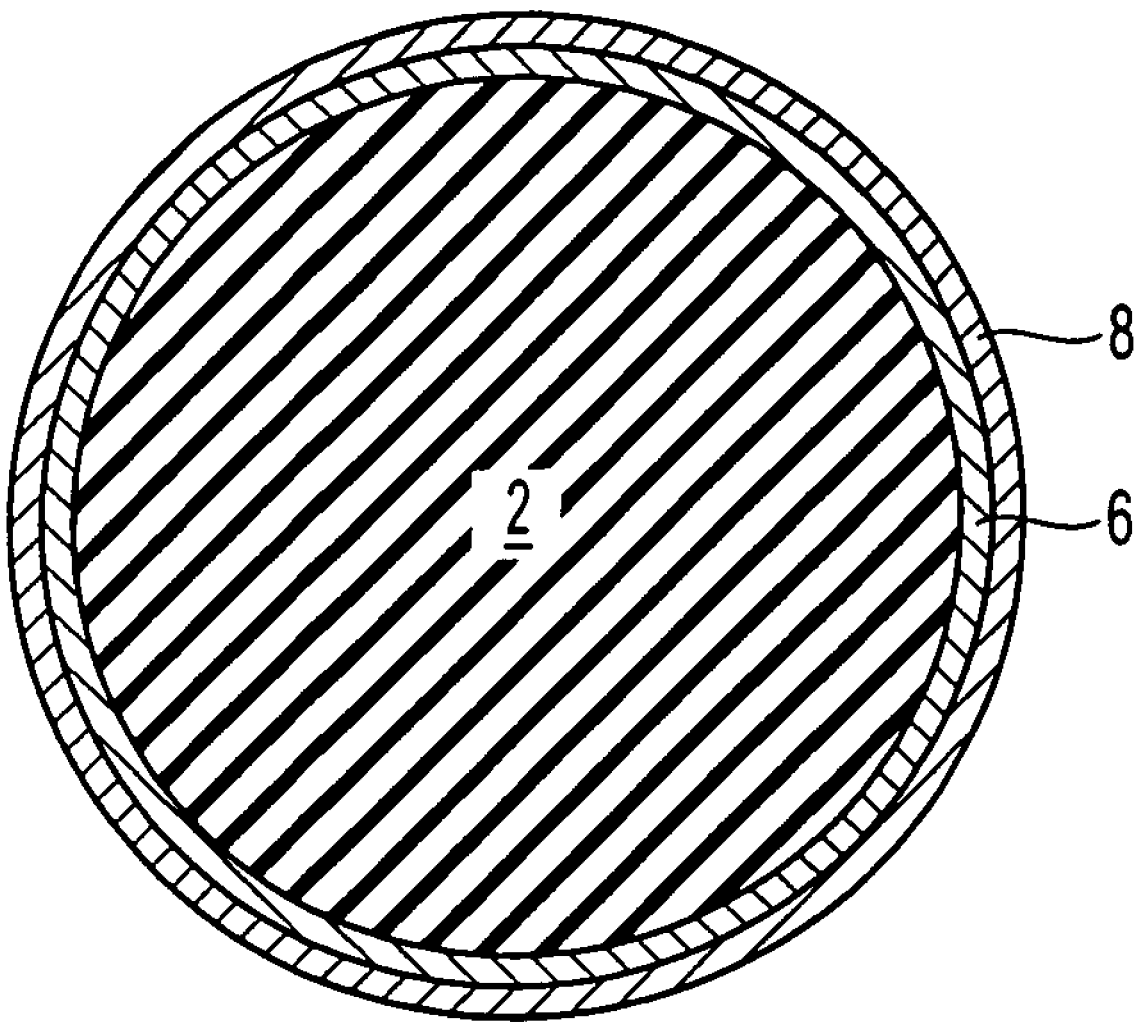
FIG. 1 is a cross sectional view of a three-layer multilayer golf ball made in accordance with an exemplary embodiment of the present invention.

Exemplary embodiments according to the present invention are described below with reference to the above drawings, in which like reference numerals designate like components.

Exemplary Golf Ball Exemplary Embodiments

FIG. 1 shows a sectional view of a multilayer golf ball made in accordance with an exemplary embodiment of the present invention that includes three layers. Such a multilayer golf ball may have a solid rubber center 2, mantle 6 and a cover 8. The solid rubber center 2 may be manufactured by using conventional compression molding processes. The components may be mixed together and extruded to form preforms, which may be then placed in cavities in the mold and may be compression molded under pressure and cured/ vulcanized to form centers. The same mix may also be injection molded. Curing may be carried out in the mold at temperatures of 280–380 degrees F. for five to twenty minutes depending on the compound. Once fully cured, the center 2 may be removed from the mold cavities and prepared for application of the mantle 6.

In one exemplary embodiment, the golf ball center 2 may be made of a solid rubber composition comprising a polybutadiene rubber center of a composition typical to the industry. Specifically, the rubber may be 90–100 PHR polybutadiene, 0–10 PHR polyisoprene, 20–40 PHR zinc diacrylate, 3–10 PHR zinc oxide, 8–40 PHR fillers, process aids and antioxidants, and 0.5–5 PHR peroxide initiator. In one exemplary embodiment, the diameter of the solid rubber center 2 may be about 1.47"±0.050."

The type and amount of crosslinking agents used to make a golf ball center may have the greatest influence on the center compression achieved. To prepare the center 2 according to one exemplary embodiment, it has been found that a center composed primarily of high-cis polybutadiene in combination with cross-linking agents, activators, initiators and fillers (active and inactive), may be used to produce a golf ball center having the desireable compression characteristics. As used herein, high-cis means a cis isomer content of greater than 93%. It is to be understood that the center formula set forth herein is but one formula that may be used to make a center having a desireable center compression.

Once formed, the solid rubber center 2 may then subjected to a conventional molding process whereby the polymer mantle 6 may be injection or compression molded around the center 2 in a manner well known to those skilled in the art.

The mantle material may be constructed from any relatively stiff material, For example, synthetic thermoplastic materials. Most notably these synthetic thermoplastic materials are ionomeric resins. Ionomeric resins are polymers containing interchain ionic bonding. As is well known in the chemical arts, ionomeric resins are generally ionic copolymers of an olefin having from about two to about eight carbon atoms, such as ethylene and a metal salt of an unsaturated carboxylic acid, such as acrylic acid, methacrylic acid, or maleic acid. The pendent ionic groups in the ionomeric resins interact to form ion-rich aggregates contained in a non-polar polymer matrix. Metal ions, such as sodium, lithium, zinc or magnesium may be used to neutralize some portion of the acidic groups in the copolymer.

An exemplary mantle composition may be an ionomer with a hardness in the range of about 50 Shore D to about 60 Shore D or broadly 55+/–5 Shore D. This may be accomplished by the use of either one grade of ionomer or the blending of several grades of ionomers or thermoplastic resins which result in the desired hardness properties. The acid level of the ionomer may vary from a low acid level of 12% and up to a high acid level of 19% depending on the grade of ionomer chosen and the ratio of blends to each other. Additionally, it is possible to create the desired hardness by the blending of a low modulus ionomer with a high modulus ionomer. An exemplary embodiment envisions all of the above stated combinations along with many other similar combinations to produce the desired hardness. The mantle layer may be molded to a thickness of about 0.050"+/–0.010". {Table 19 presents a number of suitable ionomers commercially produced by E. I. DuPont de Nemours & Company, however, similar products are also available from other commercial manufacturers, as described in greater detail, below.}

In order to shift the moment of inertia of the ball toward the periphery, an amount of high specific gravity filler may be added to the mantle material. The filler material may have a specific gravity greater than about 5.6. One exemplary filler material is tungsten, which has a specific gravity of about 19. The resulting specific gravity of the mantle layer may be between about 1.17 to 1.20, preferably about 1.19.

Once the inner polymer mantle 6 is injection or compression molded around the center 2 the polymer cover 8 may be injection or cast molded over the mantle 6. To make the cover utilizing the casting method, the reactive components of the cover may be poured or injected into cavities. The inner surfaces of the cavities may be constructed with dimple-shaped projections, which form the dimples in the cover. The process used to make the cover may be a standard process wherein one or more components may be added together to form a blend which is then injected or cast into the mold. After molding, the golf balls produced may undergo further processing steps such as pressure blasting, vibratory finishing, stamping of the logo, application of a primer, and finally, application of a top coat.

Figure 2:
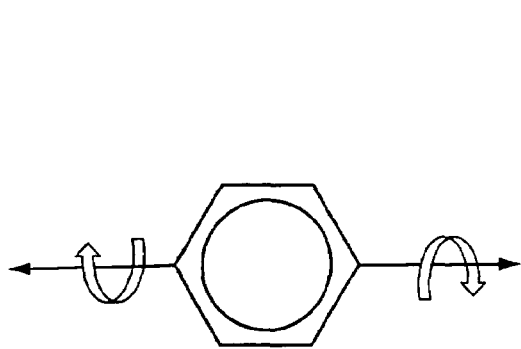
FIG. 2 is symbolic representation of a PPDI with two degrees pf rotational freedom.
Figure 3:
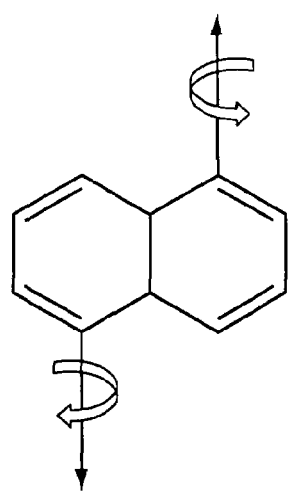
FIG. 3 is symbolic representation of an NDI with two degrees pf rotational freedom.
Figure 4:
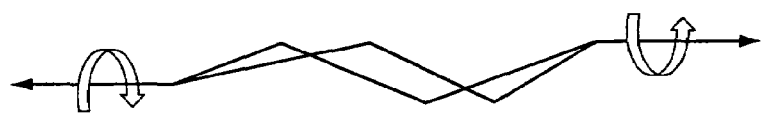
FIG. 4 is symbolic representation of a CHDI with two degrees pf rotational freedom.
Figure 5A:
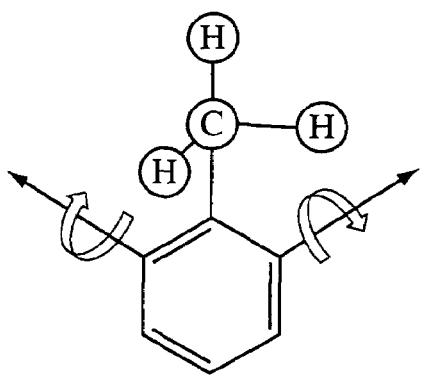
FIGS. 5A and 5B are symbolic representations of 2,6- and 2,4-TDI steric groups with two degrees pf rotational freedom, respectively.
Figure 5B:
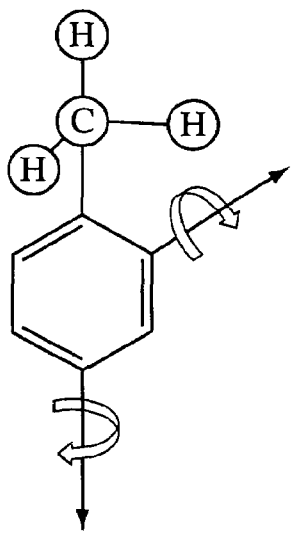
Figure 6:
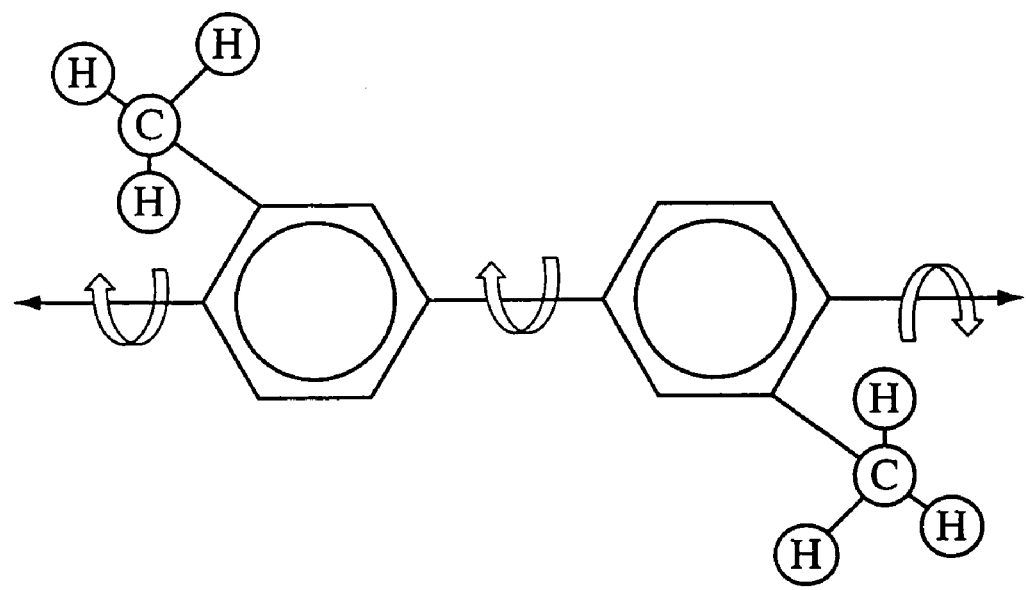
FIG. 6 is symbolic representation of TODI steric groups with three degrees of rotational freedom.
Figure 7:
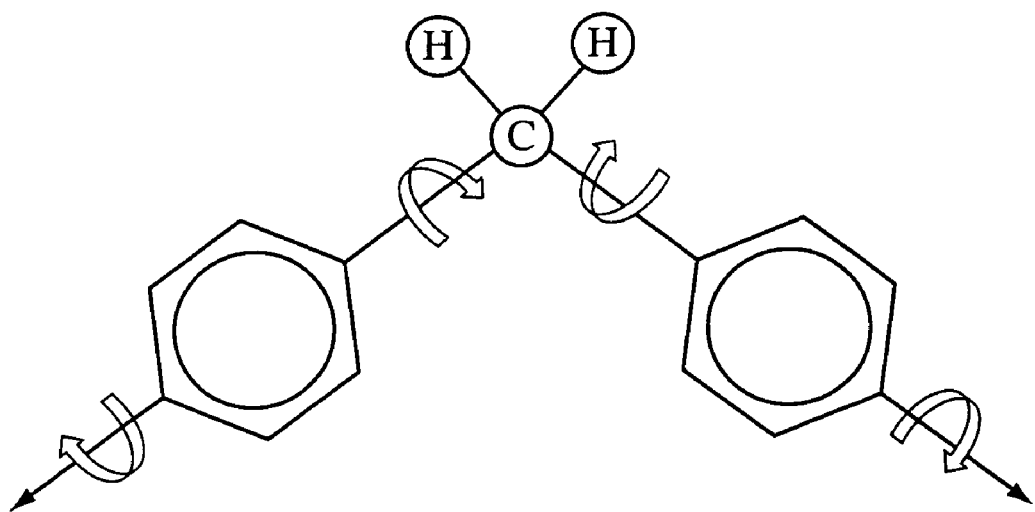
FIG. 7 is symbolic representation of MDI steric groups with four degrees of rotational freedom.

Polyurethanes, polyureas, and polyurethane-ureas have achieved an important place in elastomer technology. This is by virtue of the fact that such elastomers combine desirable mechanical properties with the ability to be easily processed by conventional plastic thermoforming and casting techniques. Furthermore, the role of polyurethanes, polyurethane-ureas and polyureas in the golf ball industry is expanding rapidly as the industry adapts polyurethane technology to replace balata as a cover material that combines superior playability with exceptional cut and abrasion resistance. Because of the wide variety of chemical structures available for use in this type of elastomer, it is important to achieve some understanding of how these structures affect end-use properties. It has been discovered that the elastomer containing the diisocyanate with the fewest degrees of rotational freedom and the least steric hindrance will possess mechanic, properties more desirable for use in the manufacture of golf balls. Specifically, a diisocyanate containing the minimum number of degrees of rotational freedom, two, hereafter referred to as a binary-diisocyanate, will generate elastomer possessing mechanical properties far more desirable than elastomers produced from diisocyanates containing an excess of rotation axes, hereafter referred to as tertiary or quaternary diisocyanates. Furthermore, if pendant groups do not sterily hinder the binary-diisocyanate the mechanical properties of the resultant elastomer may be improved further. Examples of binary-diisocyanates are p-phenylenediisocyanate (PPDI) (FIG. 2), 1,5-naphthalene diisocyanate (NDI) (FIG. 3), trans-cyclohexane 1,4-iisocyanate (CHDI) (FIG. 4), and toluene diisocyanate (TDI) (FIGS. 5A and 5B) which is commonly used as a mixture of the 2,4- and 2,6-isomers, both of which are sterily hindered. An example of a tertiary-diisocyanate is 3,3'-dimethyl-4,4'-diphenyldiisocyanate (TODI) (FIG. 6) and an example of a quaternary-diisocyanate is diphenylmethane-4,4'-diisocyanate (MDI) (FIG. 7). In conjunction with this, a relationship was discovered between the diisocyanate unit and the molar ratio of diisocyanate to polyol required in synthesizing an elastomer of a target hardness. This relationship reflects the inter-chain proximity of the diisocyanate units within the hard segment domain that is governed not only by steric factors but also by the degrees of rotational freedom of the diisocyanate unit.

Essentially, the inter-chain proximity within the hard segment domains allows the adjacent polymer chains of the binary-diisocyanate based elastomer to stack more efficiently than those of the tertiary- or quaternary-diisocyanate based elastomers. The stacking efficiency allows for stronger hydrogen bonding and hence greater cohesive energy in the hard segment phase. The, 'tightness' of the binary-diisocyanate based hard segment phase not only provides the finished elastomer with greater temperature resistance but also minimizes the loss of input mechanical energy that is used to rearrange the hard segment semi-crystalline structure. This results in a greater coefficient of restitution (COR), an important characteristic for materials used in the manufacture of golf balls.

Polyurethane may result from a reaction between an isocyanate-terminated polyurethane pre polymer and a curing agent. The polyurethane prepolymer is produced when a diisocyanate is reacted with a polyol. The pre polymer is then reacted with a curing agent. The curing agent may be either a polyamine, a polyol, or a blend of the two.

Production of the prepolymer before addition to the curing agent is known as the prepolymer process. In what is known as a one-shot process, the three reactants, diisocyanate, polyol and curing agent may be combined in one step. This invention may use any known polyurethane curing agent. Of the two processes, the prepolymer process is preferred since it allows for greater control over the reaction. Nevertheless, golf balls made in accordance with the present invention may be produced using either process.

The cover 8 of the present invention is installed around the golf ball core, which includes the mantle 6, using either injection molding or a casting process. In the casting process two hemispherical cavities may be utilized. Shortly after the first open mold half is filled with the polyurethane mixture, a second hemispherical cavity situated in a second open mold half, with the same diameter as the first mold half (e.g., a diameter of 1.68") is filled with the polyurethane mixture. After the polymer mixture in the first mold half has reached a semi-gelled or highly viscous state, a golf ball center comprising a solid spherical center with an ionomeric mantle is lowered into the first mold half containing the "semi-gelled" or "highly viscous" polyurethane. The semi-gelled or highly viscous polymer mixture in the first mold half is allowed to contact the mantle layer that has been inserted into the first mold half. After approximately 20–30 seconds, the first mold half is inverted and mated with the second mold half containing polyurethane mixture which has also reached a semi-gelled or highly viscous state. The combination of the polyurethane mixture in each of the mold halves forms the golf ball cover. The mated first and second mold halves containing the polymer mixture and golf ball center may be next heated until the polyurethane reaches a state in which it is no longer tacky and then cooled for approximately three minutes. The golf ball is then removed from the mold, and allowed to post cure for the required time at room temperature which is determined by the specific curing system utilized.

Exemplary Dimple Count Exemplary Embodiment

Figure 8:
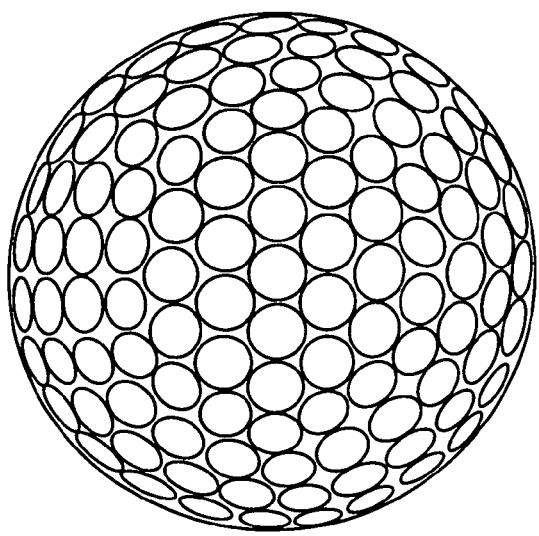
FIG. 8 is top view of a golf ball dimple pattern with 272 dimples in accordance with an exemplary embodiment of the present invention.
Figure 9:
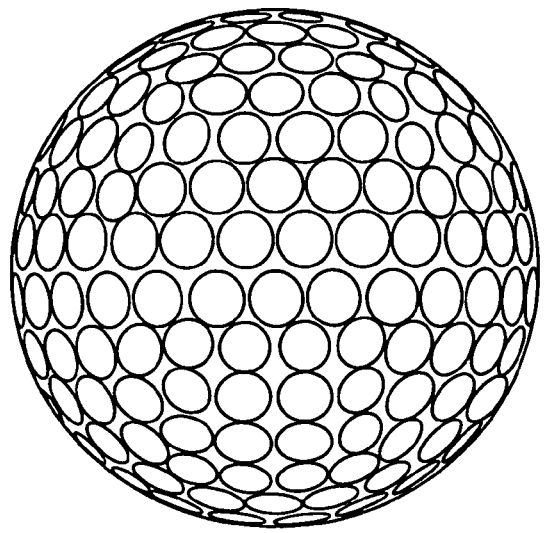
FIG. 9 is side view of a golf ball dimple pattern with 272 dimples in accordance with an exemplary embodiment of the present invention.

During this molding process, dimples may be formed on the cover. It has been found that golf balls with a dimple coverage greater than about 75% perform better than those patterns less than 75%. The present invention contemplates the use of a dimple pattern including a number of dimples between about 250 to 500 which provide a dimple coverage of at least about 70%, and preferably greater than 75%. An exemplary number of dimples is in a range from about 270 to 432, with most preferred arrangements including 272, 360, 402, 408, 420, 432 and 442. According to one aspect of the invention, a 272 dimple pattern provided excellent dimple coverage and aerodynamic performance at various launch conditions. This performance is shown in Tables 1–6 when compared to the 402 dimple pattern. FIG. 8 is top view of an exemplary golf ball dimple pattern with 272 dimples in accordance with an exemplary embodiment of the present invention. FIG. 9 is a side view of an exemplary golf ball dimple pattern with 272 dimples in accordance with an exemplary embodiment of the present invention.

TABLE 1

Exemplary Flight Characteristics

| Number of Dimples | Velocity | Launch Angle | Spin | Carry | Dispersion Area | Total |
|---|---|---|---|---|---|---|
| 402 | 235.26 | 8.49 | 3247 | 261.10 | 250.1 | 275.83 |
| 272 | 234.59 | 8.75 | 3159 | 259.44 | 256.4 | 271.32 |

TABLE 2

Exemplary Flight Characteristics (High Launch Angle Low Spin)

| Number of Dimples | Velocity | Launch Angle | Spin | Carry | Dispersion Area | Total |
|---|---|---|---|---|---|---|
| 402 | 235.86 | 10.22 | 2526 | 261.32 | 168.0 | 278.63 |
| 272 | 234.75 | 10.32 | 2456 | 262.67 | 118.9 | 277.71 |

TABLE 3

Exemplary Flight Characteristics (Low Launch Angle High Spin)

| Number of Dimples | Velocity | Launch Angle | Spin | Carry | Dispersion Area | Total |
|---|---|---|---|---|---|---|
| 402 | 235.98 | 6.67 | 3647 | 249.63 | 187.1 | 261.72 |
| 272 | 235.23 | 6.73 | 3652 | 247.99 | 185.4 | 253.39 |

TABLE 4

Exemplary Flight Characteristics (Low Launch Angle Low Spin)

| Number of Dimples | Velocity | Launch Angle | Spin | Carry | Dispersion Area | Total |
|---|---|---|---|---|---|---|
| 402 | 233.71 | 7.32 | 2596 | 249.18 | 223.4 | 274.09 |
| 272 | 232.97 | 7.24 | 2503 | 251.38 | 212.0 | 272.98 |

TABLE 5

Exemplary Flight Characteristics (Medium Launch Angle, Low Spin)

| Number of Dimples | Velocity | Launch Angle | Spin | Carry | Dispersion Area | Total |
|---|---|---|---|---|---|---|
| 402 | 235.90 | 8.75 | 2738 | 256.82 | 277.6 | 274.34 |
| 272 | 234.82 | 8.67 | 2672 | 259.07 | 102.2 | 271.10 |

TABLE 6

Exemplary Flight Characteristics (High Launch Angle, High Spin)

| Number of Dimples | Velocity | Launch Angle | Spin | Carry | Dispersion Area | Total |
|---|---|---|---|---|---|---|
| 402 | 234.25 | 11.22 | 3452 | 258.84 | 183.0 | 265.19 |
| 272 | 233.67 | 11.34 | 3337 | 254.78 | 387.4 | 259.94 |

As described, other ingredients, such as pigments, may be added to the mixture. For example, a pigment addition of 0.25–5.00% by weight of the total polyurethane prepolymer/curative mixture may be added either via a third stream to the mixhead at the time of adding the prepolymer and the curing agent or blended with the curing agent prior to mixing with the prepolymer to produce the desired color. In an exemplary embodiment, the pigment may consist of 65% $TiO_2$ and 35% carrier (typically a polyol, with or without toners) by weight. The pigment may or may not include other additives including a UV stabilizing package, optical brighteners, etc.

To produce the desired results, the reactants may be reacted to obtain a stoichiometry of between about 90–105% and preferably 95%. With respect to the NCO % content, any prepolymer used may have a NCO % between about 4.0–6.0% by weight of the prepolymer and preferably about 5.0% by weight. Systems using pure toluene diisocyanate (TDI), or mixtures of the 2,4- and 2,6-isomers, Isophorone diisocyanate (IPDI), 1,5-napthylene diisocyanate (NDI), p-phenylene diisocyanate (PPDI), 3,3'-dimethyl-4,4'-diphenyl diisocyanate (TODI), trans-cyclohexane 1,4-diisocyanate (CHDI), or diphenylmethane-4,4'-diisocyanate (MDI) as the diisocyanate and an ether, ester, polycaprolactone, or polyproplene glycol backbone are all possible choices for the polyurethane prepolymer. The polyol selected may have a molecular weight of between about 650 grams/mole to 3000 grams/mole, and preferably between about 900 grams/mole to 2000 grams/mole. The larger the molecular weight, the softer, and more flexible the polyurethane becomes. The curative preferably may be a diamine but any conventional polyurethane curative may suffice if it generates the required hardness properties.

To change the resulting characteristics, one need only change the concentrations of the reactants. For example, hardness readings ranging from 45D–65D have been produced by altering the molecular weight of the polyol component (PTMEG in one exemplary embodiment), the NCO % content and/or stoichiometry of the reaction. Even when reactant concentrations may be altered to produce different hardness levels, good physical properties may be produced within a range of alterations. Specifically, in one exemplary embodiment, the lower NCO % content of 5% and the use of a longer polyol component results in a finished polymer cover that has a hardness in the range of about 48 Shore D to 50 Shore D.

Depending on the amount of time needed to pour a particular number of golf ball molds with a single batch of the polyurethane prepolymer mix, a curing agent may be picked that will accommodate the speed requirements of the golf ball manufacturing process without having any appreciable effect on the physical characteristics of the end product.

Advantageously, polyurethane materials exhibit "high" elongation, tensile strength and tear strength. When used as the material for a golf ball cover, these physical properties translate into a golf ball cover material that exhibits superior cut, abrasion and shear resistance versus ionomers and balata when struck by hard objects such as the grooved face of a golf club head.

In one exemplary embodiment, the cover has a thickness of about 0.050" leading to provide a total diameter of core and cover of 1.680", the commercial ball diameter standard specified by the United States Golf Association.

Exemplary Multilayer Combinations

Each of Tables 7A–G, below, presents a group multi-layer golf ball exemplary embodiments designed in accordance with exemplary embodiments of the present invention to meet the needs of players with swing speeds between 95 and 120 mph and provide key performance characteristics such as:

High launch, low spin from the driver for maximum carry;

Green holding, high spin on approach with your scoring irons; and

Check and feel around the green for chipping and putting.

Table 8A–G presents performance data associated with each of the respective exemplary multi-layer golf balls presented in Tables 7A–G, along with performance data collected for a selection of commercially available golf balls under the same test conditions. A comparison of the golf ball layer characteristics presented in Table 7 with the golf ball performance data presented in Table 8, provides a good indication of the effects of changes implemented at each of the respective golf ball layers. Note: All flight data were taken at USGA settings.

TABLE 7a

Exemplary Multi-layer Golf Balls Golf Balls (Group 1)

| | Example Ball 1 | Example Ball 2 | Example Ball 3 | Example Ball 4 | Example Ball 5 | Example Ball 6 |
|---|---|---|---|---|---|---|
| Core Specifics (Layer 2 in FIG. 1) | (90 Compression) 1.51" 10.0 Dozen Core (Rubber) | (90 Compression) 1.51" 10.0 Dozen Largest Core (Rubber) | (55 compression) 1.51" 10.0 Dozen Soft | (70 Compression) 1.35" 10.0 Dozen Light | HPF (80 Compression) 1.50" 10.0 Dozen HPF 80 - AD1027 SG = 1.057 | DC Tour Type Inner Core (90 Compression) 1.35" Outer Core (80 Compression) 1.51" 10.0 Dozen |
| First Layer Specifics (Layer 6 in FIG. 1) | Thin Layer Tungsten Winding 1.60" | Heavy (SG = 1.19) HPF1000[1] - 1.60" DuPont SEP-1320-1 Tungsten | Weighted Standard Tungsten Thread 1.58" | Heavy HPF 1000 (SG = 1.19) - 1.62" DuPont-SEP-1320-1 Tungsten | Heavy (SG = 1.19) HPF1000 - 1.60" DuPont-SEP-1320-1 Tungsten 20% Filler | Surlyn 9910; Surlyn 8945; Nucrel 925; blend - 1.58" |
| Cover Layer Specifics (Layer 8 in FIG. 1) | Thin Urethane (0.030" Thickness) | Thin Urethane (0.030" Thickness) | | Thin Urethane (0.030" Thickness) | Heavy/Tough New Material Santoprene | |
| Paint Clear Coat | 950A[2] Urethane Standard Urethane Thin Standard | 950A Urethane Standard Urethane Sticky Soft | 950A Urethane Standard Urethane Thin Standard | 950A Urethane Standard Urethane Thin Standard Textured | White Paint Not Needed Standard | 950A Urethane Standard Urethane Standard |
| Dimple Design | 360 Moebius | 360 Moebius | 360 Moebius[3] | 360 Moebius | 442 | 360 Moebius |

[1]HPF1000 is a Tradename for a polymeric composition available from Dupont Industrial Plastics, Delaware.
[2]Adiprene 950A ® TDI-terminated polyether prepolymer available from Uniroyal Chemicals.
[3]U.S. Pat. No. 5,377,989 entitled, Golf Balls with Isodiametrical Dimples" herein incorporated by reference.

TABLE 7b

Exemplary Multi-layer Golf Balls (Group 2)

| | Example Ball 1 | Example Ball 2 | Example Ball 7 |
|---|---|---|---|
| Core Specifics | (90 Compression) 1.51" *5.0 Dozen SG = 1.120 | (90 Compression) 1.51" *5.0 Dozen SG- = 1.080 | (90 Compression) 1.51" *5.0 Dozen SG = 1.120 |
| First Layer Specifics | Thin Layer, Tungsten Winding 1.62" | Heavy (SG = 1.19) HPF-AD1027 - 1.62" DuPont-SEP-1307-1 Tungsten | Surlyn 9910; Surlyn 8945; Nucrel 925; blend - 1.62" |
| Cover Layer Specifics | Thin Urethane (0.030" Thickness) | Thin Urethane (0.030" Thickness) | Standard Urethane (0.030" Thickness) |
| Paint | 950A Urethane Standard | 950A Urethane Standard | 950A Urethane Standard |
| Clear Coat | 950A Urethane Sticky Soft | 950A Urethane Sticky Soft | 950A Urethane Sticky Soft |
| Dimple Design | 402 | 402 | 402 |

TABLE 7c

Exemplary Multi-layer Golf Balls (Group 3)

| | Example Ball 1 | Example Ball 2 | Example Ball 7 |
|---|---|---|---|
| Core Specifics | (90 Compression) 1.51" *5.0 Dozen SG = 1.120 | (90 Compression) 1.51" *5.0 Dozen SG = 1.080 | (90 Compression) 1.51" *5.0 Dozen SG = 1.120 |
| First Layer Specifics | Thin Layer Tungsten Winding 1.62" | Heavy (SG = 1.19) HPF-AD1027 - 1.62" DuPont-SEP-1307-1 Tungsten | Surlyn 9910; Surlyn 8945; Nucrel 925; blend - 1.62" |

TABLE 7c-continued

Exemplary Multi-layer Golf Balls (Group 3)

|  | Example Ball 1 | Example Ball 2 | Example Ball 7 |
| --- | --- | --- | --- |
| Cover Layer Specifics | Thin Urethane (0.030" Thickness) | Thin Urethane (0.030" Thickness) | Standard Urethane (0.030" Thickness) |
| Paint | 950A Urethane Standard | 950A Urethane Standard | 950A Urethane Standard |
| Clear Coat | 950A Urethane Sticky Soft | 950A Urethane Sticky Soft | 950A Urethane Sticky Soft |
| Dimple Design | 432 | 432 | 432 |

TABLE 7d

Exemplary Multi-layer Golf Balls (Group 4)

|  | Example Ball 1 | Example Ball 2 | Example Ball 7 |
| --- | --- | --- | --- |
| Core Specifics | (90 Compression) 1.51" *5.0 Dozen SG = 1.120 | (90 Compression) 1.51" *5.0 Dozen SG -= 1.080 | (90 Compression) 1.51" *5.0 Dozen SG = 1.120 |
| First Layer Specifics | Thin Layer Tungsten Winding 1.62" | Heavy (SG = 1.19) HPF-AD1027 - 1.62" DuPont-SEP-1307-1 Tungsten | Surlyn 9910; Surlyn 8945; Nucrel 925; blend - 1.62" |
| Cover Layer Specifics | Thin Urethane (0.030" Thickness) | Thin Urethane (0.030" Thickness) | Standard Urethane (0.030" Thickness) |
| Paint | 950A Urethane Standard | 950A Urethane Standard | 950A Urethane Standard |
| Clear Coat | 950A Urethane Sticky Soft | 950A Urethane Sticky Soft | 950A Urethane Sticky Soft |
| Dimple Design | 432 Moebius[1] | 432 Moebius | 432 Moebius |

[1] U.S. Pat. No. 5,877,989

TABLE 7e

Exemplary Multi-layer Golf Balls (Group 5)

|  | Example Ball 1 | Example Ball 2 | Example Ball 7 |
| --- | --- | --- | --- |
| Core Specifics | (90 Compression) 1.51" *5.0 Dozen SG = 1.120 | (90 Compression) 1.51" *5.0 Dozen SG- = 1.080 | (90 Compression) 1.51" *5.0 Dozen SG = 1.120 |
| First Layer Specifics | Thin Layer Tungsten Winding 1.62" | Heavy (SG = 1. 19) HPF-AD1027 - 1.62" DuPont-SEP-1307-1 Tungsten | Surlyn 9910; Surlyn 8945; Nucrel 925; blend - 1.62" |
| Cover Layer Specifics | Thin Urethane (0.030" Thickness) | Thin Urethane (0.030" Thickness) | Standard Urethane (0.030" Thickness) |
| Paint | 601D[1] Urethane Standard | 601D Urethane Standard | 601D Urethane Standard |
| Clear Coat | 601D Urethane Sticky Soft | 601D Urethane Sticky Soft | 601D Urethane Sticky Soft |
| Dimple Design | 402 | 402 | 402 |

[1] Adiprene 601D ® TDI-terminated polyether prepolymer available from Uniroyal Chemeicals.

TABLE 7f

Exemplary Multi-layer Golf Balls (Group 6)

|  | Example Ball 1 | Example Ball 2 | Example Ball 7 |
| --- | --- | --- | --- |
| Core Specifics | (90 Compression) 1.51" *5.0 Dozen SG = 1.120 | (90 Compression) 1.51" *5.0 Dozen SG = 1.080 | (90 Compression) 1.51" *5.0 Dozen SG = 1.120 |

TABLE 7f-continued

Exemplary Multi-layer Golf Balls (Group 6)

|  | Example Ball 1 | Example Ball 2 | Example Ball 7 |
|---|---|---|---|
| First Layer Specifics | Thin Layer Tungsten Winding 1.62" | Heavy (SG = 1.19) HPF-AD1027 - 1.62" DuPont-SEP-1307-1 Tungsten | Surlyn 9910; Surlyn 8945; Nucrel 925; blend - 1.62" |
| Cover Layer Specifics | Thin Urethane (0.030" Thickness) | Thin Urethane (0.030" Thickness) | Standard Urethane (0.030" Thickness) |
| Paint | 601D Urethane Standard | 601D Urethane Standard | 601D Urethane Standard |
| Clear Coat | 601D Urethane Sticky Soft | 601D Urethane Sticky Soft | 601D Urethane Sticky Soft |
| Dimple Design | 432 | 432 | 432 |

TABLE 7g

Exemplary Multi-layer Golf Balls (Group 7)

|  | Example Ball 1 | Example Ball 2 | Example Ball 7 |
|---|---|---|---|
| Core Specifics | (90 Compression) 1.51" *5.0 Dozen SG = 1.120 | (90 Compression) 1.51" *5.0 Dozen SG- = 1.080 | (90 Compression) 1.51" *5.0 Dozen SG = 1.120 |
| First Layer Specifics | Thin Layer Tungsten Winding 1.62" | Heavy (SG = 1.19) HPF-AD1027 - 1.62" DuPont-SEP-1307-1 Tungsten | Surlyn 9910; Surlyn 8945; Nucrel 925; blend - 1.62" |
| Cover Layer Specifics | Thin Urethane (0.030" Thickness) | Thin Urethane (0.030" Thickness) | Standard Urethane (0.030" Thickness) |
| Paint | 601D Urethane Standard | 601D Urethane Standard | 601D Urethane Standard |
| Clear Coat | 601D Urethane Sticky Soft | 601D Urethane Sticky Soft | 601D Urethane Sticky Soft |
| Dimple Design | 432 Moebius | 432 Moebius | 432 Moebius |

TABLE 8a

Flight Performance Data for Golf Balls from Table 7a
Group 1

| Ball ID | Velocity | Launch Angle | Spin | Rear Trajectory | Carry | Dispersion Area | Total |
|---|---|---|---|---|---|---|---|
| Maxfli M3 Tour 420 | 247.5 | 8.5 | 2966 | 10.1 | 273.4 | 325.6 | 286.4 |
| Titleist Pro V1 | 247.9 | 8.6 | 2735 | 10.0 | 272.7 | 224.3 | 286.8 |
| Titleist Pro V1X | 248.7 | 8.6 | 2710 | 10.3 | 279.3 | 401.7 | 290.5 |
| Callaway HX Red | 247.6 | 8.6 | 2791 | 10.1 | 280.3 | 403.9 | 290.3 |
| Example Ball 1 | 249.6 | 8.5 | 3083 | 10.6 | 270.9 | 576.4 | 284.4 |
| Example Ball 2 | 248.3 | 8.3 | 3221 | 10.8 | 270.1 | 431.7 | 280.7 |
| Example Ball 3 | 243.5 | 8.7 | 2870 | 10.1 | 265.0 | 321.0 | 279.8 |
| Example Ball 4 | 244.8 | 8.2 | 3212 | 9.9 | 258.8 | 347.6 | 271.5 |
| Example Ball 5 | 256.5 | 8.7 | 3156 | 12.4 | 256.5 | 647.7 | 260.4 |
| Example Ball 6 | 256.5 | 8.7 | 3156 | 12.4 | 256.5 | 647.7 | 260.4 |

TABLE 8b

Flight Performance Data for Golf Balls from Table 7b
Group 2

| Ball ID | Velocity | Launch Angle | Spin | Rear Trajectory | Carry | Dispersion Area | Total |
|---|---|---|---|---|---|---|---|
| Example Ball 1 | 240.76 | 8.88 | 2755 | 7.98 | 275.16 | 336.1 | 283.16 |
| Example Ball 2 | 240.80 | 8.70 | 3083 | 8.16 | 276.73 | 176.7 | 279.92 |
| Example Ball 7 | 241.48 | 9.00 | 2544 | 8.10 | 272.92 | 186.6 | 280.84 |
| Maxfli M3 Tour 420 | 236.87 | 8.92 | 2465 | 7.58 | 270.67 | 428.2 | 278.17 |
| Callaway HX Red | 238.53 | 8.93 | 2627 | 7.78 | 280.18 | 518.8 | 285.50 |

TABLE 8b-continued

Flight Performance Data for Golf Balls from Table 7b
Group 2

| Ball ID | Velocity | Launch Angle | Spin | Rear Trajectory | Carry | Dispersion Area | Total |
|---|---|---|---|---|---|---|---|
| Titleist Pro V1X | 239.27 | 9.11 | 2468 | 7.98 | 284.02 | 205.4 | 288.27 |
| Nike 1 | 238.97 | 8.87 | 2609 | 7.81 | 279.72 | 390.5 | 284.82 |
| Number of Hits | 12.00 | | | | | | |
| Wind Speed | 2.31 | Tail Left to Tail Right | | | | | |
| Temperature | 82.98 | | | | | | |
| Barometric Pressure | −29.14 | | | | | | |

TABLE 8c

Flight Performance Data for Golf Balls from Table 7c
Group 3

| Ball ID | Velocity | Launch Angle | Spin | Rear Trajectory | Carry | Dispersion Area | Total |
|---|---|---|---|---|---|---|---|
| Example Ball 1 | 239.08 | 9.00 | 2785 | 8.61 | 276.58 | 450.2 | 282.96 |
| Example Ball 2 | 239.29 | 8.72 | 3047 | 9.07 | 272.67 | 459.1 | 276.81 |
| Example Ball 7 | 239.32 | 9.10 | 2589 | 8.59 | 273.57 | 679.3 | 278.88 |
| Maxfli M3 Tour 420 | 235.87 | 9.09 | 2650 | 8.11 | 272.80 | 397.7 | 280.59 |
| Callaway HX Red | 236.06 | 9.36 | 2506 | 8.13 | 279.52 | 576.5 | 285.06 |
| Titleist Pro V1X | 237.69 | 9.32 | 2506 | 8.38 | 282.67 | 382.9 | 289.56 |
| Nike 1 | 237.84 | 9.14 | 2708 | 8.28 | 280.54 | 174.2 | 284.99 |
| Number of Hits | 12.00 | | | | | | |
| Wind Speed | 1.89 | Tail Left to Right | | | | | |
| Temperature | 84.63 | | | | | | |
| Barometric Pressure | −29.14 | | | | | | |

TABLE 8d

Flight Performance Data for Golf Balls from Table 7d
Group 4

| Ball ID | Velocity | Launch Angle | Spin | Rear Trajectory | Carry | Dispersion Area | Total |
|---|---|---|---|---|---|---|---|
| Example Ball 1 | 243.00 | 8.48 | 3043 | 8.69 | 267.60 | 311.0 | 274.76 |
| Example Ball 2 | 242.15 | 8.33 | 3260 | 8.78 | 267.00 | 249.3 | 270.69 |
| Example Ball 7 | 243.05 | 8.74 | 2820 | 8.70 | 266.23 | 434.8 | 272.24 |
| Maxfli M3 Tour 420 | 238.91 | 8.48 | 2863 | 8.06 | 266.22 | 333.2 | 274.24 |
| Callaway HX Red | 239.18 | 8.72 | 2655 | 8.15 | 276.92 | 237.9 | 281.39 |
| Titleist Pro V1X | 240.73 | 8.76 | 2621 | 8.42 | 276.21 | 262.4 | 281.39 |
| Nike 1 | 240.61 | 8.73 | 2825 | 8.40 | 272.25 | 443.9 | 279.53 |
| Number of Hits | 12.00 | | | | | | |
| Wind Speed | 4.14 | Tail Right to Left | | | | | |
| Temperature | 79.55 | | | | | | |
| Barometric Pressure | 29.29 | | | | | | |

TABLE 8e

Flight Performance Data for Golf Balls from Table 7e
Group 5

| Ball ID | Velocity | Launch Angle | Spin | Rear Trajectory | Carry | Dispersion Area | Total |
|---|---|---|---|---|---|---|---|
| Example Ball 1 | 242.19 | 8.61 | 2729 | 8.06 | 274.99 | 482.4 | 285.73 |
| Example Ball 2 | 242.20 | 8.66 | 2800 | 8.27 | 276.66 | 648.7 | 283.37 |
| Example Ball 7 | 242.94 | 8.70 | 2631 | 8.07 | 275.01 | 367.1 | 286.06 |
| Maxfli M3 Tour 420 | 239.23 | 8.58 | 2722 | 7.93 | 273.04 | 441.6 | 284.24 |
| Callaway HX Red | 239.48 | 8.46 | 2808 | 7.98 | 280.70 | 308.5 | 286.39 |
| Titleist Pro V1X | 240.73 | 8.80 | 2678 | 8.23 | 280.78 | 250.9 | 287.92 |
| Nike 1 | 240.59 | 8.72 | 2782 | 8.15 | 278.32 | 402.9 | 286.26 |
| Number of Hits | 12.00 | | | | | | |
| Wind Speed | 3.23 | Tail Right to Left | | | | | |
| Temperature | 85.41 | | | | | | |
| Barometric Pressure | 29.29 | | | | | | |

TABLE 8f

Flight Performance Data for Golf Balls from Table 7f
Group 6

| Ball ID | Velocity | Launch Angle | Spin | Rear Trajectory | Carry | Dispersion Area | Total |
|---|---|---|---|---|---|---|---|
| Ex. Ball 1 | 241.56 | 8.86 | 2688 | 8.30 | 277.75 | 569.0 | 286.40 |
| Ex. Ball 2 | 241.99 | 8.56 | 2839 | 8.52 | 277.05 | 345.8 | 282.36 |
| Ex. Ball 7 | 242.15 | 8.84 | 2597 | 8.35 | 276.18 | 354.2 | 283.99 |
| Maxfli M3 Tour 420 | 238.70 | 8.58 | 2715 | 7.97 | 272.26 | 440.9 | 279.75 |
| Callaway HX Red | 238.59 | 8.76 | 2881 | 8.04 | 279.74 | 181.2 | 287.71 |
| Titleist Pro V1X | 240.67 | 8.87 | 2605 | 8.23 | 284.14 | 270.8 | 289.51 |
| Nike 1 | 240.49 | 8.63 | 2737 | 8.15 | 279.90 | 379.6 | 287.01 |
| Number of Hits | 12.00 | | | | | | |
| Wind Speed | 2.70 | Tail Right to Left | | | | | |
| Temperature | 84.61 | | | | | | |
| Barometric Pressure | 29.26 | | | | | | |

TABLE 8g

Flight Performance Data for Golf Balls from Table 7g
Group 7

| Ball ID | Velocity | Launch Angle | Spin | Rear Trajectory | Carry | Dispersion Area | Total |
|---|---|---|---|---|---|---|---|
| Example Ball 1 | 241.18 | 8.82 | 2836 | 8.60 | 269.03 | 477.9 | 276.44 |
| Example Ball 2 | 240.61 | 8.86 | 3134 | 8.92 | 268.04 | 335.6 | 275.08 |
| Example Ball 7 | 241.31 | 8.98 | 2811 | 8.58 | 268.29 | 250.5 | 275.93 |
| Maxfli M3 Tour 420 | 237.73 | 8.89 | 2811 | 8.51 | 265.17 | 356.2 | 273.07 |
| Callaway HX Red | 237.81 | 8.88 | 2729 | 8.27 | 278.69 | 334.3 | 285.90 |
| Titleist Pro V1X | 238.73 | 9.11 | 2703 | 8.74 | 277.09 | 192.0 | 284.26 |
| Nike 1 | 239.02 | 8.99 | 3019 | 8.74 | 272.75 | 260.5 | 281.59 |
| Number of Hits | 12.00 | | | | | | |
| Wind Speed | 4.43 | Tail Right to Left | | | | | |
| Temperature | 77.17 | | | | | | |
| Barometric Pressure | 29.37 | | | | | | |

In an exemplary golf ball exemplary embodiment, the material used for the cover, i.e., layer 8 in FIG. 1, may be any of the following: a thermoset material selected from the group consisting of polyurethane, urethane ionomer, urethane epoxy, urethane acrylate, dynamically vulcanized elastomer, functionalized styrenebutadiene elastomer or a thermoplastic material selected from the group consisting of ionomer resin, polyurethane, polyetherester, polyetheramide, polyester, metallocene polymer nylon, acrylonitrile butadiene-styrene copolymer.

The core may be made of composition of rubber which may generally include polybutadiene rubber center of a composition typical to the industry and which may specifically be 90–100 PHR polybutadiene, 0–10 PHR polyisoprene, 20–35 PHR zinc diacrylate, 3–10 PHR zinc oxide, 0–30 PHR fillers, process aids and antioxidants, 0.5–5 PHR peroxide initiator.

Center layer 2 (FIG. 1) may have a diameter of between 1.40 inches and 1.50 inches, and preferably 1.45 inches to 1.48 inches. The weight of layer 2 may be between 25 grams and 32 grams and preferably be between 28 grams and 31 grams. The diameter and weight of the core, consisting of layers 2 through 6, may be between 1.53 inches and 1.66 inches and weigh between 33 grams and 44 grams, preferably between 1.56 inches and 1.60 inches in diameter and between 36 grams and 40 grams in weight. For example, layer 2 may consist of the rubber specified above weighing 28.3 grams and measuring 1.45 inches in diameter, encapsulated by layer 6 consisting of a 50/50 weight percent blend of Surlyn® ionomer resins 8150 and 9150 weighing 9.2 grams and measuring 1.58 inches in diameter, encapsulated by layer 8 consisting of thermoset polyurethane comprised of toluene diisocyanate (TDI), polytetramethyleneglycol ether (PTMEG), and a 50/50 weight percent blend of Ethacure 100 and Ethacure 300 formulated to 95% stoichiometry with a prepolymer of TDI and PTMEG having a percent NCO of 6.00%, said layer measuring 1.68 inches in diameter and weighing 7.91 grams.

The compression of the above exemplary embodiment of the center may be 50–60 PGA. The compression of the above exemplary embodiment of the core may be 70–80 PGA. The compression of the above exemplary embodiment of the ball is 80–90 PGA. Compression is subject to fairly wide variation due to manufacturing process variations.

Another exemplary golf ball of the instant invention has a preferably solid center with a diameter in the range of about 1.3 to 1.6 inches, preferably about 1.48 inches; an ionomeric polymer mantle with a hardness in the range of about 50 to 70, preferably about 60 Shore D to about 62 Shore D and a wall thickness of about 0.025 to 0.25 inches, preferably about 0.050 inches, and a polyurethane cover with hardness in the range of about 35 to 60, preferably about 48 Shore D to about 50 Shore D. This combination has been found to produce a ball with impressive distance capabilities, yet which still satisfies USGA regulations. The use of these properties in the golf ball of the instant invention is based on the recognition that it is the combination of the center compression, center composition, center size, mantle composition, mantle thickness, mantle hardness, cover composition, and cover hardness that will produce a ball that will travel the greatest distance without compromising shot-making feel.

In yet another exemplary embodiment, the golf ball center may be made of a solid rubber composition comprising a polybutadiene rubber center of a composition typical to the industry. Specifically, the rubber may be 90–100 PHR polybutadiene, 0–10 PHR polyisoprene, 20–40 PHR zinc diacrylate, 3–10 PHR zinc oxide, 8–40 PHR fillers, process aids and antioxidants, and 0.5–5 PHR peroxide initiator. In the exemplary embodiment, the diameter of the solid rubber center 2 is about 1.48±0.030".

The characteristics of the core may be modified to produce the desired properties by adding heavy fillers having a specific gravity of greater than at least 5.6. The preferred heavy filler to add is tungsten, which makes up less than 2% by volume of the core but maximizes the rubber content while maintaining the desired weight. The description of fillers and the method of introducing them into the core are contained in the application Ser. No. 09/863,910, which is entitled "Heavy filler in golf ball cores" filed on May 23, 2001, the contents of which are incorporated by their entirety.

In still yet another exemplary embodiment the mantle composition is a ionomer with a hardness in the range of about 60 Shore D to about 62 Shore D or broadly 61±4 Shore D. This can be accomplished by the use of either one grade of ionomer or the blending of several grades of ionomers or thermoplastic resins which result in the desired hardness properties. The acid level of the ionomer can vary from a low acid level of 12% and up to a high acid level of 19% depending on the grade of ionomer chosen and the ratio of blends to each other. Additionally, it is possible to create the desired hardness by the blending of a low modulus ionomer with a high modulus ionomer. The present invention envisions all of the above stated combinations (e.g. as described above and in Tables 7A–G) along with many other similar combinations to produce the desired hardness. The mantle layer may be molded to a thickness of about 0.050"±0.010".

Other imbodiments may include three piece solid golf ball comprised of a solid rubber core, an inner cover, and an outer cover, which exhibits the feel and control characteristics of a three piece wound golf ball. The inner cover is an ionomer with a shore D measured in the 64 to 73 range, and the outer cover is made of a polyurethane material whose measured shore D is less than 60. The ionomer inner cover—core combination will give the "complex core" of the product a good C.O.R to compression ratio, while the polyurethane outer cover will give it excellent spin, feel, and control.

Another golf ball exemplary embodiment may have a solid center with a diameter in the range of about 1.48 inches; an ionomeric polymer mantle with a hardness in the range of about 60 Shore D to about 62 Shore D and a wall thickness of about 0.050 inches, and a polyurethane cover with hardness in the range of about 48 Shore D to about 50 Shore D. The golf ball exemplary embodiment may have a mantle composition that is an ionomer with a hardness in the range of about 60 Shore D to about 62 Shore D or broadly 61±4 Shore D. This can be accomplished by the use of either one grade of ionomer or the blending of several grades of ionomers or thermoplastic resins which result in the desired hardness properties, as described below.

The mantle may be comprised of ionomer resins available from several manufacturers. The mantle may be an ionomer of any appropriate grade, either a single grade or a blend of multiple grades as long as the resultant polymer has properties of about 61±4 Shore D and preferably 60 Shore D to about 62 Shore D. The mantle is molded to about a thickness of 0.050 inches±0.010 inch. For example, an exemplary embodiment may be a three piece, or layer, ball with a solid (=1.48" dia.) core covered with 60–62D ionomer (=0.05" wall thickness) and finally a 48 D to 50 D (=0.05" wall thickness) polyurethane casting for a top cover.

Yet another multi-layer golf ball exemplary embodiment may have a 1.48" diameter solid polybutadiene sphere, a 60–62 Shore D ionomer (e.g., a 70/30 weight percent blend of Surlyn 8150/9230W) molded to 0.50" wall thickness (resulting in a center/mantle combined diameter of 1.58"), and a 48–50 Shore D cast polyurethane molded to 0.050-inch wall thickness.

Still yet another multi-layer golf ball exemplary embodiment may include an inner cover made of aliphatic polyketone.

Exemplary Inner Cover Embodiments

An iterative approach was used to determine the effect of forming an inner cover (i.e., layer 6 in FIG. 1) of a multi-layer golf ball from different commercially available compounds and compositions of compounds. Table 9, below, presents a list of exemplary compounds and compositions of compounds that were initially considered for use in forming an inner cover layer within a golf ball exemplary embodiment in accordance with the present invention.

TABLE 9

Exemplary Inner Cover Compounds/Compositions

| Identifier | Inner Cover Compound/Composition (Layer 6) |
|---|---|
| A | Surlyn ® AD8549 |
| B | 50/50 blend of Surlyn ® AD8549/9945 |
| C | 50/50 blend of Surlyn ® AD8549/7940 |
| D | 50/50 blend of Surlyn ® 8150/7940 |
| E | 45/30/25 blend of Surlyn ® 9150/8150/6910 - PTP Blend |
| F | Hytrel Polyester 5556 |
| G | Crastin PBT ST820 |
| J | Surlyn ® Reflections, neat |
| K | Bayer Makrolon Polycarbonate PC5658 |
| L | Shell Carilon Polyketone |
| N | Elf Atochem PBAX 7233 |
| P | Elf Atochem PBAX 6333 |
| Q | 50/50 blend of Surlyn ® 8150/9150 |
| R | 30/45/25 blend of Surlyn ® 8150/9150/RX8419 Nucrel |
| S | 25/45/30 blend of Surlyn ® 8150/9150/7940 |
| T | 40/30/30 blend of Surlyn ® 8920/9910/Nucrel 2906 |

Iteration 1:

The focus of iteration 1 was to determine the core compression and Core COR that can be produced with each of the compounds listed in Table 9. During iteration 1 a common composition was used to create a center layer (i.e., layer 2 in FIG. 1) and each center was ground to 1.450." Next an inner cover layer (i.e., layer 6 in FIG. 1) was molded around each center using the respective compounds/compositions identified in Table 9 to form golf ball cores, each core molded to a diameter of 1.580." These cores were each tested to determine the core compression and Core COR for each of the respective inner cover layer material listed in Table 9. The results of iteration 1 sample core compression and core COR testing is presented in Table 10. As shown in Table 10, golf ball cores constructed with inner cover layers based upon compounds/compositions L, K, J, M, N in Table 9, failed to meet minimum core compression and core COR threshold limits and therefore were not included in further testing iterations, described below.

TABLE 10

Iteration 1 Core Compression and Core COR Results

| Inner Cover Layer Material | Weight Pre/Post Glebar | Core Compression | Core COR | Core Durability |
|---|---|---|---|---|
| A - AD8549 | 38.96 37.86 | 92 | .714 | Pass |
| B - AD8549/9945 | 39.34 37.97 | 91 | .715 | Pass |
| C - AD8549/7940 | 39.06 38.13 | 93 | .720 | Pass |
| D - 8150/7940 | 39.13 38.01 | 92 | .723 | Pass |
| E - 9150/8150/6910 | 39.26 38.24 | 93 | .722 | Pass |
| F - Hytrel | 40.95 39.18 | 84 | .686 | Pass |
| G - PBT | 41.10 39.70 | 111 | .694 | Pass |
| P - PBAX 6333 | 38.35 | 89 | .675 | Pass |
| Q - 8150/9150 | 38.05 | 94 | .710 | Pass |
| L, K, J, M, N | | | | Fail |

TABLE 11

Iteration 2 Test Ball Characteristics

| Test Iteration/ Inner Cover Layer Material | Core Weight | Core Compression | Ball COR | Ball Shore D Shore C | Ball Weight | Ball Comp |
|---|---|---|---|---|---|---|
| 2/B | 37.47 | 73.7 | .696 | 55 75 | 45.28 | 84.2 |
| 2/C | 37.27 | 75 | .693 | 54.7 80 | 45.25 | 84.3 |
| 2/D | 37.35 | 75.5 | .698 | 54 80 | 45.32 | 86.7 |
| 2/E | 37.43 | 75.3 | .701 | 54.9 75 | 45.30 | 85.5 |
| XS Tour EC | 36.75 | 82 | .707 | 56 88 | 45.40 | 87 |

TABLE 12

Iteration 2 Test Results

| Test Iteration/ Inner Cover Layer Material | Driver Carry (yards) Spin (rpm) Speed (ft/sec) | 5 Iron Carry (yards) Spin (rpm) Speed (ft/sec) | 8 Iron Carry (yards) Spin (rpm) Speed (ft/sec) | P. Wedge Carry (yards) Spin (rpm) Speed (ft/sec) |
|---|---|---|---|---|
| 2/B | 232.7 2549 227 | 180.4 4680 181 | 133.8 6666 153 | 95.8 8342 127 |
| 2/C | 233.8 2493 227 | 179.6 4539 180 | 133.8 6651 153 | 96.4 8307 127 |
| 2/D | 234.2 2346 227 | 181.0 4522 180 | 134.1 6674 152 | 96.3 8208 127 |
| 2/E | 231.8 2483 228 | 180.2 4603 180 | 133.9 6737 152 | 95.8 8166 128 |
| XS Tour EC | 237.7 2858 229 | 180.8 5294 182 | 133.1 7338 153 | 96.1 8146 127 |

Iteration 2:

During iteration 2, exemplary embodiment of golf balls were constructed based upon a common center (i.e. layer 2 in FIG. 1), a common outer cover (i.e., layer 8 in FIG. 1) and an inner cover (i.e. layer 6 in FIG. 1) select from the list of compound/compositions listed in Table 9. The common center was 1.460" in diameter, with a weight of 31.12 g, a 53 PGA Compression, an 82 Rebound Resilience, a 79 Shore C, a 100 Shore A, a 49 Shore D, and lavender coloring. The common outer cover was a urethane cover.

Table 11 presents selected physical characteristics of the exemplary golf ball embodiments tested during iteration 2. Each ball exemplary embodiment was constructed to include the features described above and with a unique inner cover layer material indicated below. Included for comparison purposes in Table 11 is data related to the commercially produced XS Tour EC golf ball.

Based upon the test data produced as a result of iteration 2, it appears that the speed of each prototype golf ball is slightly lower than the XS-Tour EC. The prototypes spin is also significantly lower on Driver, 5-Iron, and 8-Iron. The lower spin on the Driver is good, however, the 5-Iron and 8-Iron need to have higher spin. As a result, the prototypes produced for testing in iteration 3 were constructed with a harder center to try to increase the spin on mid-to-short-irons. Upon hitting the 2/B balls with a P. Wedge, the 2B was determined to have a softer Feel and sound less clicky than the XS Tour EC.

Iteration 3:

During iteration 3, exemplary golf ball embodiments were constructed based upon a common center (i.e., a Gold Slazenger core ground to 1.480" with a compression of 71.) and a urethane cover. Inner covers were varied and use the same inner cover lettering/naming convention was used in iteration 3 and was used in iterations 1 and 2. Exemplary golf ball embodiment characteristics and test results are presented in Table 13 and Table 14, respectively.

TABLE 13

Iteration 3 Test Ball Characteristics

| Test Iteration/<br>Inner Cover<br>Layer Material | Core<br>Weight | Core<br>Com-<br>pression | Ball<br>COR | Ball<br>Shore D<br>Shore C | Ball<br>Weight | Ball<br>Comp |
|---|---|---|---|---|---|---|
| 3/D | 37.70 | 88.40 | .697 | 65 | 45.30 | 102 |
| 3/E | 37.83 | 88.55 | .701 | 69 | 45.27 | 103 |
| 3/Q | 37.90 | 89.48 | .703 | 67 | 45.39 | 104 |
| XS Tour EC | 36.75 | 82 | .707 | 56<br>88 | 45.40 | 87 |

TABLE 14

Iteration 3 Test Results

| Test Iteration/<br>Inner Cover<br>Layer Material | Driver<br>Carry (yards)<br>Spin (rpm)<br>Speed (ft/sec) | 5 Iron<br>Carry (yards)<br>Spin (rpm)<br>Speed (ft/sec) | 8 Iron<br>Carry (yards)<br>Spin (rpm)<br>Speed (ft/sec) | P. Wedge<br>Carry (yards)<br>Spin (rpm)<br>Speed (ft/sec) |
|---|---|---|---|---|
| 3D | 246.5<br>2385<br>232 | 182.0<br>5189<br>186 | 140.8<br>6663<br>153 | 110.9<br>8200<br>128 |
| 3E | 246.4<br>2551<br>231 | 181.5<br>5132<br>187 | 139.8<br>6466<br>152 | 110.9<br>8274<br>129 |
| 3Q | 245.0<br>2478<br>231 | 181.7<br>5089<br>185 | 140.9<br>6513<br>153 | 110.7<br>8228<br>128 |
| XS Tour EC | 249.3<br>2737<br>231 | 181.2<br>5188<br>186 | 140.1<br>7121<br>154 | 110.7<br>8600<br>128 |

Based upon the test data produced as a result of iteration 3, it appears that the three balls performed roughly equivalent to the XS Tour EC in terms of carry distance. However, the test balls were roughly 15 points higher in compression. Offsetting that somewhat was the 20-point difference in Shore C cover hardness, with the XS Tour measuring approximately 88 and the test balls measuring approximately 68. In addition, the higher compression of the test balls-led to a lower spin rate-on all clubs except the 5 Iron.

Exemplary Polyurethane Outer Covers

A polyurethane cover used in exemplary golf gall embodiments of the present invention may be produced with commercially available compounds. Examples of binary diisocyanates that satisfy the requirements are PPDI, NDI, CHDI, TDI, TODI and MDI and a long list of homologs of these binary diisocyanates (not displayed) having similar chemical structures and properties but with slightly modified functionality and additional sidegroups. The binary diisocyanates discussed above can be used alone or in any combination with any known diisocyanates to tailor the properties of the thermoset polymer formed when combined with the selected curatives and polyols. Table 15 (below) contains additional examples of diisocyanates. Table 16 presents a listing of relative reactivity of isocyanates with active hydrogen compounds.

A selected binary diisocyanate may be reacted with a nucleophilic co-reactant or blend of co-reactants having a stoichiometric ratio of about 0.9 to 1.2 to that of the diisocyanate. The reaction forms a carbamic acid, hypothetical acid that exists only in the form of its esters and salts formed across the C=N double bond.

A typical nucleophilic co-reactants may be selected from the alcohol and amine families. The formula representing the family of nucleophilic co-reactants is HX—$R_2$, where X represents either an O or NH respectively. The nucleophilic co-reactants can be described to fall into two classes, polyol and curative combined to form the final polyurethane. The polyol and curative can be used in combination to manufacture the composition.

The properties of the composition can be controlled through the Hard Segment Ratio (HSR), which is defined as the stoichiometric ratio of the polyol to the curative. Another method of tailoring the properties is through an isocyanates index, which is the ratio of stoichiometric equivalents of binary diisocyanate to stoichiometric equivalents of nucleophilic co-reactants.

Polyols may be selected to react with the diisocyanate to form the polyurethane cover material. Typical polyols have a molecular weight number average of about between 800 to 4,000. Polyols may be grouped into two categories based on their structure, polyethers and polyesters. When polyols are used in thermoplastic urethanes they are typically limited to linear, di-functional polyols. Polyols that contain branching or tri-functionality have a high probability to lead to cross linking making the reaction non-reversible and thus becoming a thermoset polymer even at low to moderate temperatures. Polyols contain the unit (—O—CO—) as part of the backbone of the polyol and mer repeat unit. Therefore in thermoset reactions polyols that are branched and tri-functional are choices to increase the performance and durability of polyurethanes produced.

Forms of polyols that may be used are in the following groups Adipic Acid Based, Amine Terminated Polyols, Caprolactone Based, Hexanoic Acid Based, Maleic Acid Based, Monols, Phthalic Acid Based, PEG-Based, Polyester Polyols, PPG-Based, PTMEG based, Terephthalic Acid Based and other diols or triols having more than two (2) functional groups are all available in forms which would be suitable to combine with the selected reactants to form a golf ball cover.

Polycaprolactone polyols are made by the polymerization of s-caprolactone in the presence of a glycol initiator, such as ethylene glycol (See Table 17).

Polyethers are also called polyalkylene glycols or polyalkane oxides and contain an (—O—$CH_2$) group within the backbone of the polymer chain as part of the repeating unit or mer of the polymer.

Other suitable polyols are those based upon dimerized fatty acids, hydroxy-functional saturated and unsaturated polyethylenes, and hodroxy-functional polybutadienes, polyethers esters, and polytetramethyleneglycolethers.

Curatives may be low molecular weight, multifunctional compounds that react with the —NCO groups of diisocyanates. Typically, curative have molecular weight number average of about 60 to 600. Curatives may be categorized as either alcohols or amines. Amines contain the reactive —NH group, which, upon reaction with the —NCO group, yields a urea. Polyureas are typically thermoset polymers, however some combinations of aliphatic diisocyanates with hindered aliphatic amines can produced melt processable polyurea thermoplastic resins.

Alcohols contain a reactive hydoxyl group (—OH) which upon reaction with an isocyanate group (—NCO) forms a urethane. Polyol curatives commonly used in the industry are ethylene glycol; 1,4-butendiol (1,4-BD or BDO); 1,6-hexanediol; bis-(hydoxyethyl) hydroquinone (HQEE); 1,4-cyclohaxanedimenthol (CHDM); glycerol; 1,3-propanediol; and trimethylol propane (TMP).

Polyamine curatives are ethylene diamine; toluene diamine (TDA); diamineodiphenylmethane (MDA); 3,3'-dichloror-4,4'-diamino-diphenylmethane (MBOCA); 3,5-diamno-4-chloro-benzoat; diethyltoluene diamine (DETDA); trimethylene glycol di-p-aminobenzoate (TMAB); 4,4'-methylenebis(3-chloro-2,6-diethylaniline (M-CDEA); 3,5-dimetylthio-2,4-toluenediamine; and 3,5-dimethylthio-2,6-toluenediamine.

When the above reactants comprising diisocyanates, polyols and curatives are combined they form a resulting polymers that is either a thermoset or thermoplastic. If the resultant combination form a thermoset it can be molded into a superior golf ball cover using injection molding, compression molding or other conventional processing techniques known to be useful to form golf ball covers from thermoplastics in the industry.

If the combination forms a thermoset then the preferred method is a casting process using either a one shot or prepolymer process. Additional processing methods are discussed in application Ser. No. 09/567,498, filed on May 9, 2000, entitled "Method For Manufacturing Two and Three Piece Golf Balls Constructed From Polyurethane Material", the contents of which are herein incorporated by their entirety.

A polymer desirable for use with a golf ball for a cover is made by combining at least one diisocyanate, and/or at least one polyol or curative in such a proportion so that it has an Isocyanate Index (II) is between 0.9 and 1.2, which is preferably between 0.95 and 1.15, and most favorably between 1.03 and 1.13. Furthermore the polymer is combined in a proportion so that the diisocyanate, polyol and curative has a Hard Segment Ratio (HSR) of about 0.9 to 5.0, preferably about between 1.5 and 3.5, and most favorably between 1.7 and 2.5. The ingredients may be combined in the correct proportions using either the one shot process or through a prepolymer process.

The polyol selected in the process may be either a single polyol of a single molecular weight (defined by the polydispersity index) or a blend of the same species have a broad spectrum of molecular weight polyols combined. The polymer polydispersity index, the ratio of the weight-average molecular weight (WAMW) to the number-average molecular weight (NAMW), is directly related to the standard deviation of the polymer molecular weight distribution. Therefore, the polydispersity index can be used as a measure of the width of the molecular weight distribution, and WAMW is never smaller than NAMW.

The polydispersity index (PDI) is a measure of the breadth of a molecular weight distribution of a polymer or blend of polymers. Narrow distributions have PDI's near 1 while a very broad distribution can have a PDI of 10. Step growth polymers and free radical chain growth polymers usually have a PDI near 2. Anionically polymerized chain growth polymers typically have PDI's as low as 1.02. A broad PDI can be produced by mixing two narrow PDI polymers together that have a large divergence in molecular weight.

The first method to estimate the polydispersity index $M_W/M_N$ from viscosity versus shear rate data. The second computes the values of four different polydispersity measures from frequency response data in the linear viscoelastic region. These measures are: Crossover Point Index, Dow Rheology Index, High Elasticity Index, and Global Distribution Index.

The polyol used can also be a combination of two or more polyols having a similar molecular weight or a combination of molecular weights of multiple species of polyol. The curative is either a single species or a combination of two or more curatives to control the reaction. The curative may also be a mixture of alcohols, amines and/or polyols.

A golf ball outer cover created using such a polyurethane material may be used with all known core configurations and future discovered cores because it provides exceptional durability and performance as required in superior golf ball constructions. The present invention may use a golf ball cover material having the desired properties produced from a binary diisocyanate having at least two degree of rotational freedom. The method for producing a thermoset cover is produced by a similar procedure using different starting materials is disclosed in Ser. No. 09/018,283 filed on Feb. 4, 1998 entitled "Polyurethane Material For Two and Three Piece Golf Balls", the contents of which are incorporated in its entirety.

TABLE 15

Commercial Isocyanates

| COMMON NAME/ CAS Name | FORMULA | STRUCTURE | MOLECULAR WEIGHT | MP (° C.) | BP (° C.) | DENSITY (G.ML) |
|---|---|---|---|---|---|---|
| toluene 2,4-diisocyanate (TDI)/ 2,4-diisocyanate-1-mehyi-benzene | $C_9H_6O_2N_2$ | | 174.2 | 21.8 | 121 (10 mm Hg) | 1.061 (° C.) |
| toluene 2,6-diisocyanate (TDI)/2,6-diisocyanate-1-mehyi-benzene | $C_9H_6O_2N_2$ | | 174.2 | 18.2 | 120 (10 mm Hg) | 1.2271 (20° C.) |
| 65:35 mixture of toluene 2,4 and 2,6-diisocyanate (TDI-65/35) | $C_9H_6O_2N_2$ | | 174.2 | 5.0 | 121 (10 mm Hg) | 1.222 (20° C.) |
| 80:20 mixture of toluene 2,4 and 2,6-diisocyanate (TDI-80/20) | $C_9H_6O_2N_2$ | | 174.2 | 13.6 | 121 (10 mm Hg) | 1.221 (20° C.) |
| 4,4'-diphenyl methane diisocyanate (MDI)/ 1,1'-methylenebis(4-isocyanato-benzene) | $C_{15}H_{10}O_2N_2$ | | 250.3 | 39.5 | 208 (10 mm Hg) | 1.183 (50° C.) |
| 2,4'-diphenyl methane diisocyanate (MDI)/1-isocyanato-2-(4-isocyanatophenyl) methylbenzene | $C_{15}H_{10}O_2N_2$ | | 250.3 | 34.5 | 154 (1, 3 mm Hg) | 1.192 (40° C.) |
| 2,2'-diphenyl methane diisocyanate (MDI)/ 1,1'-methylenebis(2-isocyanato-benzene) | $C_{15}H_{10}O_2N_2$ | | 250.3 | 46.5 | 145 (1, 3 mm Hg) | 1.188 (50° C.) |
| hexamethylene diisocyanate (HDI)/ 1,6-diisocyanatohexane | $C_8H_{12}O_2N_2$ | OCN—$(CH_2)_5$—NCO | 168.2 | −67 | 127 (10 mm Hg) | 1.047 (20° C.) |
| isophorone diisocyanate (IPDI)/ 5-isocyabato-1-(isocyanatomethy)-1,3,3-trimethylcyclohexane | $C_{12}H_{18}O_2N_2$ | | 222.3 | −60 | 158 (10 mm Hg) | 1.061 (20° C.) |

TABLE 15-continued

Commercial Isocyanates

| COMMON NAME/ CAS Name | FORMULA | STRUCTURE | MOLECULAR WEIGHT | MP (° C.) | BP (° C.) | DENSITY (G.ML) |
|---|---|---|---|---|---|---|
| m-tetramethylxylene diisocyanate (m-TMXDI)/1,3-bis(1-isocyanato-1-methyethy)benzene | $C_{14}H_{16}N_2O_2$ | | 244.3 | — | 150 (50 mm Hg) | 1.05 (20° C.) |
| dicyclohexylmethane 4,4'-diisocyanate (HMDI)/1,1'-methylebis(4-isocyanato-cyclohexane) | $C_{15}H_{22}O_2N_2$ | | 262.3 | 19–23 | 179 (10 mm Hg) | — |
| triphenylmethane-4,4',4''-triisocyanate/1,1',1''-methylidynetris(4-isocyanatobenzene) | $C_{22}H_{13}O_3N_3$ | | 367.4 | 91 | — | — |
| naphthalene 1,5-diisocyanate (NDI)/1,5-diisocyanatonaphtha-lene | $C_{12}H_6O_2N_2$ | | 210.2 | 127 | 183 (10 mm Hg) | 1.450 (20° C.) |
| p-phenylene diisocyante (PPDI)/1,4-diidocyanatobenzene | $C_8H_4O_2N_2$ | | 160.1 | 96 | 111 (12 mm Hg) | 1.441 (20° C.) |

TABLE 16

Relative reactivity of isocyanates with active hydrogen compounds

| ACTIVE HYDROGEN COMPOUND | TYPICAL STRUCTURE | RELATIVE REACTION RATE* |
|---|---|---|
| Primary aliphatic amine | R—NH$_2$ | 100.000 |
| Secondary aliphatic amine | RR'NH | 20.000–50.000 |
| Primary aromatic amine | Ar—NH$_2$ | 200–300 |
| Primary hydroxyl | RCH$_2$—OH | 100 |
| Water | HOH | 100 |
| Carboxilic acid | RCOOH | 40 |
| Secondary hydroxyl | RR'CH—OH | 30 |
| Ureas | R—NH—CO—NH—R | 15 |
| Tertiary hydroxyl | RR'R''C—OH | 0.5 |
| Urethane | R—NH—CO—O—R | 0.3 |
| Amide | RCO—NH$_2$ | 0.1 |

TABLE 17

Commercially Available Polycaprolactones (Available from Solvay Chemicals)

| CAPA Polyol | Functionality & Initiator* | Apx. Mol. Wt. | OH Value (mg KOH/g) | Acid Value (mg KOH/g) | Physical Form @ room temp. | Reactivity | Viscosity (mPA·s)** | Melt Range °C. | Comment |
|---|---|---|---|---|---|---|---|---|---|
| 2043 | 2-BDO | 400 | 280 | <0.5 | Liquid | Slow | 40 | 0–10 | |
| 2054 | 2-DEG | 550 | 204 | <0.5 | Liquid | Fast | 60 | 18–23 | |
| 2077A | 2-HDO | 750 | 150 | <0.01 | Paste | Slow | 85 | 20–30 | Premium diol |
| 2085 | 2-DEG | 830 | 135 | <0.5 | Paste | Slow | 100 | 25–30 | |
| 2100 | 2-NPG | 1000 | 112 | <0.5 | Paste | Fast | 150 | 30–40 | |
| 2100A | 2-NPG | 1000 | 112 | <0.1 | Paste | Fast | 150 | 30–40 | improved hydrolysis resistance |
| 2101A | 2-NPG | 1000 | 112 | <0.1 | Paste | Slow | 150 | 30–40 | improved hydrolysis resistance |
| 2121 | 2-NPG | 1250 | 90 | <0.5 | Waxy | Slow | 180 | 35–45 | |
| 2125 | 2-DEG | 1250 | 90 | <0.5 | Waxy | Slow | 180 | 35–45 | |
| 2125A | 2-NPG | 1250 | 90 | <0.1 | Waxy | Slow | 175 | 35–45 | improved hydrolysis resistance |
| 2200 | 2-NPG | 2000 | 56 | <0.5 | Waxy | Fast | 480 | 40–50 | |
| 2200A | 2-NPG | 2000 | 56 | <0.1 | Waxy | Fast | 480 | 40–50 | improved hydrolysis resistance |
| 2200D | 2-NPG | 2000 | 56 | <0.5 | Waxy | Fast | 480 | 40–50 | improved hydrolysis resistance, low viscosity, reduced volatiles |
| 2200P | 2-NPG | 2000 | 56 | <0.1 | Waxy | Fast | 400 | 40–50 | improved hydrolysis resistance, lower viscosity |
| 2201 | 2-NPG | 2000 | 56 | <0.5 | Waxy | Slow | 480 | 40–50 | |
| 2201A | 2-NPG | 2000 | 56 | <0.1 | Waxy | Slow | 385 | 40–50 | improved hydrolysis resistance |
| 2205 | 2-DEG | 2000 | 56 | <0.5 | Waxy | Slow | 435 | 40–50 | |
| 2302 | 2-BDO | 3000 | 37 | <0.5 | Waxy | Fast | 1100 | 50–60 | |
| 2302A | 2-BDO | 3000 | 37 | <0.1 | Waxy | Fast | 1100 | 50–60 | improved hydrolysis resistance |
| 2304 | 2-DEG | 3000 | 37 | <0.5 | Waxy | Fast | 1050 | 50–60 | |
| 2402 | 2-BDO | 4000 | 28 | <0.5 | Waxy | Fast | 1670 | 55–60 | |
| 3022 | 3-DEG/GLY | 240 | 540 | <1.0 | Liquid | Fast | 40 | 0–10 | |
| 3031 | 3-TMP | 300 | 560 | <1.0 | Liquid | Slow | 170 | 0–10 | |
| 3041 | 3-TMP | 400 | 560 | <1.0 | Liquid | Slow | 160 | 0–10 | |
| 3050 | 3-TMP | 540 | 310 | <1.0 | Liquid | Fast | 160 | 0–10 | |
| 3091 | 3-TMP | 900 | 183 | <1.0 | Liquid | Slow | 165 | 0–10 | |
| 3201 | 3-TMP | 2000 | 84 | <0.5 | Waxy | Slow | 355 | 40–50 | |
| 4101 | 4-PENTA | 1000 | 218 | <1.0 | Liquid | Slow | 260 | 10–20 | |
| 7201A | 2-PTMEG | 2000 | 56 | <0.1 | Paste | Slow | 315 | 30–35 | PTMEG-CAPA copolymer |
| HC1060 | 2-DMPA | 600 | 180 | <90 | Waxy | Slow | 545 | 35–40 | acid functionality |
| HC1100 | 2-DMAP | 1000 | 110 | <60 | Waxy | Slow | 610 | 45–50 | acid functionality |
| HC1200 | 2-DMPA | 2000 | 56 | <30 | Waxy | Slow | 940 | 45–50 | acid functionality |

TABLE 18

Abbreviations Used in Table 17

| Abbrev. | *Initiator |
|---|---|
| NPG | neopentyl glycol |
| BDO | butane diol |
| DEG | diethylene glycol |
| HDO | hexane diol |

TABLE 18-continued

Abbreviations Used in Table 17

| Abbrev. | *Initiator |
|---|---|
| TMP | trimethylol propane |
| DEG/GLY | diethylene glycol/glycerine blend |
| PENTA | pentaerythritol |
| PTMEG | poly tetramethyl ether glycol |
| DMPA | dimethyl proprionic acid |

**viscosity: typical values, shear rate = 500 Sec$^{-1}$ at 60° C.

TABLE 19

Percent Acid Content/Neutralization For Certain Dupont Ionomers

| Grade | % Acid Target | Cation | % Neutralization Target | Flex Modulus (Kpsi/Mp) | Shore D | Specific Gravity |
|---|---|---|---|---|---|---|
| 6320 | 9 | Mg | 49 | 7.7/53.1 | 43 | 0.95 |
| 6910 | 15 | Mg | 56 | 54/ | 63 | |
| 8140 | 19 | Na | 37 | 75/517 | 65 | 0.96 |
| 8150 | 19 | Na | 45 | 71/489.5 | 65 | 0.97 |
| 8320 | 9 | Na | 52 | 4.4/30.3 | 36 | 0.95 |
| 8945 | 15 | Na | 51 | 65/448 | 65 | 0.95 |
| 9120 | 19 | Zn | 36 | 62/427.5 | 66 | 0.97 |
| 9150 | 19 | Zn | 39 | 52/358.5 | 63 | 0.97 |
| 9320W | 9 | Zn | 51 | 4.3/29.6 | 40 | 0.96 |
| 9910 | 15 | Zn | 58 | 48/330 | 64 | 0.97 |
| HPF 1000 | ? | Mg | 100 | 31/220 | 52 | ? |
| Nucrel 925 | 15 | None | 0 | 10.8/74 | 50 | 0.94 |
| Nucrel 2906 | 19 | None | 0 | 12/82.7 | 63 | 0.95 |
| Nucrel 960 | 15 | None | 0 | 8/55.1 | 46 | 0.94 |

It will be appreciated that the exemplary embodiments described above and illustrated in the drawings represent only a few of the many golf ball component/layer compositions/configurations and only a few of the many ways of creating novel multi-layer golf balls based upon arranged combinations of the described novel components/layers. Therefore, the present invention is not limited to the specific exemplary embodiments disclosed herein, but includes other golf ball component/layer compositions/configurations and novel combinations of such components/layers to produce novel multi-layer golf balls.

A golf ball in accordance with the present invention may be constructed using any commercially available fabrication and/or assembly techniques including but not limited to: the use of one step or prepolymer mixing of component materials; compression molding; injection molding; reaction injection molding (RIM); any design, method of manufacture and combination of molds; any post-processing techniques such as pressure blasting, vibratory finishing; and any logo, primer and/or topcoat application techniques.

Reaction injection molding ("RIM") according to the invention includes any injection molding process in which two or more components are reactive upon contact and/or addition into a mold cavity. The invention further includes several different sub-types of reaction injection molding, e.g., such as liquid injection molding ("LIM"), reinforced reaction injection molding ("RRIM"), and structural reaction injection molding ("SRIM"). Liquid injection molding occurs when the two or more components are in liquid form and includes subclasses micro-LIM and nano-LIM, which refer to smaller and much smaller injection volumes, respectively, as compared to most commercial processes. Reinforced RIM occurs with one or more filler materials being added to the two or more components prior to injection into the mold cavity. Structural RIM occurs where there is a preform around which the two or more components are injected within the mold cavity. The preform is generally in fiber or mesh form but may be made from any material sufficient to substantially withstand the injection pressures typically associated with the RIM process. In SRIM, a composite material is typically formed.

A golf ball center, or core, in accordance with an exemplary embodiment of the present invention is not limited to a solid core, but may include any type of core that provides appropriate characteristics for the specific golf ball exemplary embodiment. Such centers may include, but are not limited to: a thread wound core, a liquid center core, a gel center core or a multi-piece center, etc.

A golf ball in accordance with the present invention is not limited to the layer materials described above in relation to core, inner layer and outer cover materials, but may use any existing and/or future materials or compositions, having either proprietary or non-proprietary compositions, which may be used to produce the described physical qualities and characteristics described. Commercially available products that may be used in exemplary embodiments of the present invention are described in greater detail below.

A golf ball in accordance with the present invention may use any number and quantity of filler materials in the core, inner layers and/or outer cover. Such filler materials are not limited to the filler materials specifically address, but includes any filler material that may be used to lighten and/or increase the weight/density of a layer in a manner that affects the moment of inertia and/or flight characteristics of the golf ball. Commercially available products that may be used in exemplary embodiments of the present invention are described in greater detail below.

A multi-layer golf ball in accordance with the present invention may include any number of layers within each of the described inner cover layer, center layer and combinations thereof. Individual layers may be constructed of the same or different materials.

The dimensions of individual layers with a multi-layer golf ball in accordance with the present invention are not limited to the specific diameters and dimensions specified but may include any variations that result in a center layer, core and/or golf ball with performance characteristics that are the same or substantially similar to the performance characteristics described.

Additional Exemplary Layer Materials

Monomeric resins are polymers containing interchain ionic bonding. As a result of their toughness, durability and flight characteristics, various ionomeric resins sold by E. I. DuPont de Nemours & Company under the trademark "Surlyn®" and more recently, by the Exxon Corporation (see U.S. Pat. No. 4,911,451) under the trademarks "ESCOR®" and the trade name "Iotek," have become the materials of choice for the construction of golf ball covers over the traditional "balata" (transpolyisoprene, natural or synthetic) rubbers. As stated, the softer balata covers, although exhibiting enhanced playability properties, lack the durability (cut and abrasion resistance, fatigue endurance, etc.) properties required for repetitive play.

Ionomeric resins are generally ionic copolymers of an olefin, such as ethylene, and a metal salt of an unsaturated carboxylic acid, such as acrylic acid, methacrylic acid, or maleic acid. Metal ions, such as sodium or zinc, are used to neutralize some portion of the acidic group in the copolymer resulting in a thermoplastic elastomer exhibiting enhanced properties, i.e. durability, etc., for golf ball cover construction over balata. However, some of the advantages gained in increased durability have been offset to some degree by the decreases produced in playability. This is because although the ionomeric resins are very durable, they tend to be very hard when utilized for golf ball cover construction, and thus lack the degree of softness required to impart the spin necessary to control the ball in flight. Since the ionomeric resins are harder than balata, the ionomeric resin covers do not compress as much against the face of the club upon impact, thereby producing less spin. In addition, the harder and more durable ionomeric resins lack the "feel" characteristic associated with the softer balata related covers.

There are currently more than fifty (50) commercial grades of ionomers available both from DuPont and Exxon, with a wide range of properties which vary according to the type and amount of metal cations, molecular weight, composition of the base resin (i.e., relative content of ethylene and methacrylic and/or acrylic acid groups) and additive ingredients such as reinforcement agents, etc., a great deal of research continues in order to develop a golf ball cover composition exhibiting not only the improved impact resistance and carrying distance properties produced by the "hard" ionomeric resins, but also the playability (i.e., "spin," "feel," etc.) characteristics previously associated with the "soft" balata covers, properties which are still desired by the more skilled golfer.

Although the inner layer cover composition preferably includes a high acid ionomeric resin and the scope of the patent embraces all known high acid ionomeric resins falling within the parameters set forth above, only a relatively limited number of these high acid ionomeric resins have recently become commercially available.

The high acid ionomeric resins available from Exxon under the designation "Escor®" and or "Iotek", are somewhat similar to the high acid ionomeric resins available under the "Surlyn®" trademark. However, since the Escor®/Iotek ionomeric resins are sodium or zinc salts of poly(ethylene-acrylic acid) and the "Surlyn®" resins are zinc, sodium, magnesium, etc. salts of poly(ethylene-methacrylic acid), distinct differences in properties exist.

Examples of the high acid methacrylic acid based ionomers found suitable for use in accordance with this invention include Surlyn®8220 and 8240 (both formerly known as forms of Surlyn AD-8422), Surlyn®9220 (zinc cation), Surlyn® SEP-503-1 (zinc cation), and Surlyn® SEP-503-2 (magnesium cation). According to DuPont, all of these ionomers contain from about 18.5 to about 21.5% by weight methacrylic acid.

More particularly, Surlyn® AD-8422 is currently commercially available from DuPont in a number of different grades (i.e., AD-8422-2, AD-8422-3, AD-8422-5, etc.) based upon differences in melt index. According to DuPont, Surlyn® 8422, which is believed recently to have been redesignated as 8220 and 8240, offers the following general properties when compared to Surlyn® 8920, the stiffest, hardest of all on the low acid grades.

TABLE 20

Comparison of Low Acid and High Acid Surlyn Products

|  | LOW ACID (15 wt % Acid) | HIGH ACID (>20 wt % Acid) | |
| --- | --- | --- | --- |
|  | SURLYN® 8920 | SURLYN® 8422-2 | SURLYN® 8422-3 |
| IONOMER |  |  |  |
| Cation | Na | Na | Na |
| Melt Index | 1.2 | 2.8 | 1.0 |
| Sodium, Wt % | 2.3 | 1.9 | 2.4 |
| Base Resin Ml | 60 | 60 | 60 |
| MP[1], ° C. | 88 | 86 | 85 |
| FP[1], ° C. | 47 | 48.5 | 45 |
| COMPRESSION MOLDING[2] |  |  |  |
| Tensile Break, psi | 4350 | 4190 | 5330 |
| Yield, psi | 2880 | 3670 | 3590 |
| Elongation, % | 315 | 263 | 289 |
| Flex Mod, K psi | 53.2 | 76.4 | 88.3 |
| Shore D hardness | 66 | 67 | 68 |

[1]DSC second heat, 10° C./min heating rate.
[2]Samples compression molded at 150° C. annealed 24 hours at 60° C. 8422-2, -3 were homogenized at 190° C. before molding.

In comparing Surlyn® 8920 to Surlyn® 8422-2 and Surlyn® 8422-3 (see Table 20), it is noted that the high acid Surlyn® 8422-2 and 8422-3 ionomers have a higher tensile yield, lower elongation, slightly higher Shore D hardness and much higher flexural modulus. Surlyn® 8920 contains 15 weight percent methacrylic acid and is 59% neutralized with sodium.

In addition, Surlyn®SEP-503-1 (zinc cation) and Surlyn® SEP-503-2 (magnesium cation) are high acid zinc and magnesium versions of the Surlyn® AD 8422 high acid ionomers. When compared to the Surlyn® AD 8422 high acid ionomers, the Surlyn® SEP-503-1 and SEP-503-2 ionomers may be defined as shown in Table 21.

TABLE 21

Comparison of Surlyn Products with Different Cations

| Surlyn ® Ionomer | Ion | Melt Index | Neutralization % |
| --- | --- | --- | --- |
| AD 8422-3 | Na | 1.0 | 45 |
| SEP 503-1 | Zn | 0.8 | 38 |
| SEP 503-2 | Mg | 1.8 | 43 |

Furthermore, Surlyn® 8162 is a zinc cation ionomer resin containing approximately 20% by weight (i.e., 18.5–21.5% weight) methacrylic acid copolymer that may have been 30–70% neutralized. Surlyn® 8162 is currently commercially available from DuPont.

Examples of the high acid acrylic acid based ionomers suitable for use in the present invention also include the Escort or Iotek high acid ethylene acrylic acid ionomers produced by Exxon such as Ex 1001, 1002, 959, 960, 989, 990, 1003, 1004, 993, 994. In this regard, Escor® or Iotek 959 is a sodium ion neutralized ethylene-acrylic neutralized ethylene-acrylic acid copolymer. According to Exxon, Ioteks 959 and 960 contain from about 19.0 to 21.0% by weight acrylic acid with approximately 30 to about 70 percent of the acid groups neutralized with sodium and zinc ions, respectively. Representative physical properties of these high acid acrylic acid based ionomers are shown in Tables 22 and 23.

TABLE 22

Representative Exxon High Acid Ionomers

| PROPERTY | Ex 1001 | Ex 1002 | ESCOR ® (IOTEK) 959 | Ex 1003 | Ex 1004 | ESCOR ® (IOTEK) 960 |
|---|---|---|---|---|---|---|
| Melt index, g/10 min | 10 | 1.6 | 2.1 | 1.1 | 2.0 | 1.8 |
| Cation | Na | Na | Na | Zn | Zn | Zn |
| Melting Point, ° C. | 83.7 | 83.7 | — | 82 | 82.5 | 79 |
| Vcat Softening Point, ° C. | 51.5 | 51.5 | 58 | 56 | 55 | 55 |
| Tensile @ Break | 34.4 MPa | 31.7 MPa | 34 MPa | 24.8 MPa | 20.6 MPa | 24 MPa |
| Elongation @ Break, % | 341 | 348 | 280 | 387 | 437 | 430 |
| Hardness, Shore D | 63 | 62 | 65 | 54 | 53 | 57 |
| Flexural Modulus | 365 MPa | 38U MPa | 480 MPa | 147 MPa | 130 Mpa | 170 MPa |

TABLE 23

Additional Representative Exxon High Acid Ionomers

| Property | Unit | EX 989 | EX 993 | EX 994 | EX 990 |
|---|---|---|---|---|---|
| Melt index | g/10 min | 1.30 | 1.25 | 1.32 | 1.24 |
| Moisture | ppm | 482 | 214 | 997 | 654 |
| Cation type | — | Na | Li | K | Zn |
| M+ content by AAS | wt % | 2.74 | 0.87 | 4.54 | 0 |
| Zn content by AAS | wt % | 0 | 0 | 0 | 3.16 |
| Density | kg/m³ | 959 | 945 | 976 | 977 |
| Vicat softening point | ° C. | 52.5 | 51 | 50 | 55.0 |
| Crystallization point | ° C. | 40.1 | 39.8 | 44.9 | 54.4 |
| Melting point | ° C. | 82.6 | 81.0 | 80.4 | 81.0 |
| Tensile at yield | MPa | 23.8 | 24.6 | 22 | 16.5 |
| Tensile at break | MPa | 32.3 | 31.1 | 29.7 | 23.8 |
| Elongation at break | % | 330 | 260 | 340 | 357 |
| 1% secant modulus | MPa | 389 | 379 | 312 | 205 |
| Flexural modulus | MPa | 340 | 368 | 303 | 183 |
| Abrasion resistance | mg | 20.0 | 9.2 | 15.2 | 20.5 |
| Hardness Shore D | — | 62 | 62.5 | 61 | 56 |
| Zwick Rebound | % | 61 | 63 | 59 | 48 |

Furthermore, a number of new high acid ionomers neutralized to various extents by several different types of metal cations, such as by manganese, lithium, potassium, calcium and nickel cations, several new high acid ionomers and/or high acid ionomer blends besides sodium, zinc and magnesium high acid ionomers or ionomer blends are now available for golf ball cover production. These new cation neutralized high acid ionomer blends produce inner cover layer compositions exhibiting enhanced hardness and resilience due to synergies which occur during processing. Consequently, the metal cation neutralized high acid ionomer resins recently produced may be blended to produce substantially higher C.O.R.'s than those produced by the low acid ionomer inner cover compositions presently commercially available.

More particularly, several new metal cation neutralized high acid ionomer resins have been produced by neutralizing, to various extents, high acid copolymers of an alpha-olefin and an alpha, beta-unsaturated carboxylic acid with a wide variety of different metal cation salts. Optionally, a softening comonomer may be included in the copolymer. Generally, the alpha-olefin may have from 2 to 10 carbon atoms and is preferably ethylene, and the unsaturated carboxylic acid is a carboxylic acid may have from about 3 to 8 carbons. Examples of such acids include acrylic acid, methacrylic acid, ethacryliic acid, chloroacrylic acid, crotonic acid, maleic acid, fumaric acid, and itaconic acid, with acrylic acid being preferred.

The softening comonomer that may be optionally included in the inner cover layer for an exemplary golf ball embodiment may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or lnethacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are hot limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 39 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

Along these lines, examples of the preferred high acid base copolymers which fulfill the criteria set forth above, are a series of ethylene-acrylic copolymers which are commercially available from The Dow Chemical Company, Midland, Mich., under the "Primacor" designation. These high acid base copolymers exhibit the typical properties set forth below in Table 24.

TABLE 24

Representative Properties of Primacor Etbylene-Acrylic Acid Copolymers

| GRADE | % ACID | DENSITY, g/cc | MELT INDEX, g/10 min | TENSILE YD. ST (psi) | FLEXURAL MODULUS (psi) | VICAT SOFT PT (° C.) | SHORE D HARDNESS |
|---|---|---|---|---|---|---|---|
| ASTM | | D-792 | D-1238* | D-630 | D-790 | D-1525 | D-2240 |
| 5980 | 20.0 | 0.958 | 300.0 | — | 4800 | 43 | 50 |
| 5990 | 20.0 | 0.955 | 1300.0 | 650 | | 40 | 42 |
| 5981 | 20.0 | 0.960 | 300.0 | 900 | 3200 | 46 | 48 |
| 5983 | 20.0 | 0.958 | 500.0 | 850 | 3100 | 44 | 45 |
| 5991 | 20.0 | 0.953 | 2600.0 | 635 | 2600 | 38 | 40 |

*190° C.

The metal cation salts used in these materials are those salts which provide the metal cations capable of neutralizing, to various extents, the carboxylic acid groups of the high acid copolymer. These include acetate, oxide or hydroxide salts of lithium, calcium, zinc, sodium, potassium, nickel, magnesium, and manganese.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide, magnesium acetate. Sources of manganese include manganese acetate and manganese oxide.

The new metal cation neutralized high acid ionomer resins are produced by reacting the high acid base copolymer with various amounts of the metal cation salts above the crystalline melting point of the copolymer, such as at a temperature from about 200° F. to about 500° F., preferably from about 250° F. to about 350° F. under high shear conditions at a pressure of from about 10 psi to 10,000 psi. Other well known blending techniques may also be used. The amount of metal cation salt utilized to produce the new metal cation neutralized high acid based ionomer resins is the quantity which provides a sufficient amount of the metal cations to neutralize the desired percentage of the carboxylic acid groups in the high acid copolymer. The extent of neutralization is generally from about 10% to about 90%.

As indicated below in Table 25, a number of new types of metal cation neutralized high acid ionomers may be obtained from the above indicated process. These include new high acid ionomer resins neutralized to various extents with manganese, lithium, potassium, calcium and nickel cations. In addition, when a high acid ethylene/acrylic acid copolymer is utilized as the base copolymer component of the invention and this component is subsequently neutralized to various extents with the metal cation salts producing acrylic acid based high acid ionomer resins neutralized with cations such as sodium, potassium, lithium, zinc, magnesium, manganese, calcium and nickel, several new cation neutralized acrylic acid based high acid ionomer resins are produced.

TABLE 25

Representative Metal Cation Neutralized High Acid Ionomers

| Formulation No. | Wt-% Cation Salt | Wt-%° Neutralization | Melt Index | C.O.R. | Shore D Hardness |
|---|---|---|---|---|---|
| 1(NaOH) | 6.98 | 67.5 | 0.9 | .804 | 71 |
| 2(NaOH) | 5.66 | 54.0 | 2.4 | .808 | 73 |
| 3(NaOH) | 3.84 | 35.9 | 12.2 | .812 | 69 |
| 4(NaOH) | 2.91 | 27.0 | 17.5 | .812 | (brittle) |
| 5(MnAc) | 19.6 | 71.7 | 7.5 | .809 | 73 |
| 6(MnAc) | 23.1 | 88.3 | 3.5 | .814 | 77 |
| 7(MnAc) | 15.3 | 53.0 | 7.5 | .810 | 72 |
| 8(MnAc) | 26.5 | 106 | 0.7 | .813 | (brittle) |
| 9(LiOH) | 4.54 | 71.3 | 0.6 | .810 | 74 |
| 10(LiOH) | 3.38 | 52.5 | 4.2 | .818 | 72 |
| 11(LiOH) | 2.34 | 35.9 | 18.6 | .815 | 72 |
| 12(KOH) | 5.30 | 36.0 | 19.3 | Broke | 70 |
| 13(KOH) | 8.26 | 57.9 | 7.18 | .804 | 70 |
| 14(KOH) | 10.7 | 77.0 | 4.3 | .801 | 67 |
| 15(ZnAc) | 17.9 | 71.5 | 0.2 | .806 | 71 |
| 16(ZnAc) | 13.9 | 53.0 | 0.9 | .797 | 69 |

TABLE 25-continued

Representative Metal Cation Neutralized High Acid Ionomers

| 17(ZnAc) | 9.91 | 36.1 | 3.4 | .793 | 67 |
|---|---|---|---|---|---|
| 18(MgAc) | 17.4 | 70.7 | 2.8 | .814 | 74 |
| 19(MgAc) | 20.6 | 87.1 | 1.5 | .815 | 76 |
| 20(MgAc) | 13.8 | 53.8 | 4.1 | .814 | 74 |
| 21(CaAc) | 13.2 | 69.2 | 1.1 | .813 | 74 |
| 22(CaAc) | 7.12 | 34.9 | 10.1 | .808 | 70 |

Controls:
50/50 Blend of Ioteks 8000/7030 C.O.R. = .810/65 Shore D Hardness
DuPont High Acid Surlyn ® 8422 (Na) C.O.R. = .811/70 Shore D Hardness
DuPont High Acid Surlyn ® 8182 (Zn) C.O.R. = .807/65 Shore D Hardness
Exxon High Acid Iotek EX-960 (Zn) C.O.R. = .796/65 Shore D Hardness

| Formulation No. | Wt-% Cation Salt | Wt-% Neutralization | Melt Index | C.O.R. |
|---|---|---|---|---|
| 23(MgO) | 2.91 | 53.5 | 2.5 | .813 |
| 24(MgO) | 3.85 | 71.5 | 2.8 | .808 |
| 25(MgO) | 4.76 | 89.3 | 1.1 | .809 |
| 26(MgO) | 1.96 | 35.7 | 7.5 | .815 |

Control for Formulations 23–26 is 50/50 Iotek 8000/7030, C.O.R. = .814, Formulation 26 C.O.R. may be normalized to that control accordingly

| Formulation No. | Wt-% Cation Salt | Wt-% Neutralization | Melt Index | C.O.R. | Shore D Hardness |
|---|---|---|---|---|---|
| 27(NiAc) | 13.04 | 61.1 | 0.2 | .802 | 71 |
| 28(NiAc) | 10.71 | 48.9 | 0.5 | .799 | 72 |
| 29(NiAc) | 8.26 | 36.7 | 1.8 | .796 | 69 |
| 30(NiAc) | 5.66 | 24.4 | 7.5 | .786 | 64 |

Control for Formulation Nos 27–30 is 50/50 Iotek 8000/7030, C.O.R = .807

When compared to low acid versions of similar cation neutralized ionomer resins, the new metal cation neutralized high acid ionomer resins exhibit enhanced hardness, modulus and resilience characteristics. These are properties that are particularly desirable in a number of thermoplastic fields, including the field of golf ball manufacturing.

When utilized in the construction of the inner layer of a multi-layered golf ball, it has been found that the new acrylic acid based high acid ionomers extend the range of hardness beyond that previously obtainable while maintaining the beneficial properties (i.e. durability, click, feel, etc.) of the softer low acid ionomer covered balls, such as balls produced utilizing the low acid ionomers.

Moreover, as a result of the development of a number of new acrylic acid based high acid ionomer resins neutralized to various extents by several different types of metal cations, such as manganese, lithium, potassium, calcium and nickel cations, several new ionomers or ionomer blends are now available for production of an inner cover layer of a multi-layered golf ball. By using these high acid ionomer resins, harder, stiffer inner cover layers may have higher C.O.R.s, and thus longer distance, may be obtained.

The low acid ionomers which may be suitable for use in formulating the inner layer compositions of the 3 layer and 4 layer exemplary embodiments of the subject invention are ionic copolymers which are the metal, i.e., sodium, zinc, magnesium, etc., salts of the reaction product of an olefin may have from about 2 to 8 carbon atoms and an unsaturated monocarboxylie acid may have from about 3 to 8 carbon atoms. Preferably, the ionomeric resins are copolymers of ethylene and either acrylic or methacrylic acid. In some circumstances, an additional comonomer such as an acrylate ester (i.e., iso- or n-butylacrylate, etc.) can also be included to produce a softer terpolymer. The carboxylic acid groups of the copolymer are partially neutralized (i.e., approximately 10–100%, prefer-ably 30–70%) by the metal ions. Each of the low acid ionomer resins which may be included in the inner layer cover compositions of the invention contains 16% by weight or less of a carboxylic acid.

The inner layer compositions include the low acid ionomers such as those developed and sold by E. I. DuPont de Nemours & Company under the trademark "Surlyn®" and by Exxon Corporation under the trademark "Escor®" or tradename "Iotek," or blends thereof.

The low acid ionomer resins available from Exxon under the designation "Escort)" and/or "Iotek," are somewhat similar to the low acid ionomeric resins available under the "Surlyn®" trademark. However, since the Escor®/Iotek ionomeric resins are sodium or zinc salts of poly(ethylene-acrylic acid) and the "Surlyn®" resins are zinc, sodium, magnesium, etc. salts of poly(ethylene-methacrylic acid), distinct differences in properties exist.

When utilized in the construction of the inner layer of a multi-layered golf ball, it has been found that the low acid ionomer blends extend the range of compression and spin rates beyond that previously obtainable. More preferably, it has been found that when two or more low acid ionomers, particularly blends of sodium and zinc ionomers, are processed to produce the covers of multi-layered golf balls, (i.e., the inner cover layer herein) the resulting golf balls will travel further and at an enhanced spin rate than previously known multi-layered golf balls. Such an improvement is particularly noticeable in enlarged or oversized golf balls.

An exemplary inner cover layer may be formed primarily of fully non-ionomeric thermoplastic material. Suitable non-ionomeric materials include metallocene catalyzed polyolefins or polyamides, polyamide/ionomer blends, polycarbonates, polyphenylene ether/ionomer blends, etc., which may have a Shore D hardness of ≧60 and preferably have a flex modulus of greater than about 30,000 psi, or other hardness and flex modulus values which are comparable to the properties of the ionomers described above. Other suitable materials include but are not limited to thermoplastic or thermosetting polyurethanes/polyureas, including castable polyurethanes/polyureas, reaction injection moldable polyurethanes/polyureas, thermoplastic block polyesters, such as a polyester elastomer marketed by DuPont under the trademark Hytrel®, thermoplastic block polyamides, such as a polyester amide marked by Elf Atochem S. A. under the trademark Pebax®, a blend of two or more non-ionomeric thermoplastic elastomers, or a blend of one or more ionomers and one or more non-ionomeric thermoplastic elastomers. These materials may be blended with the ionomers described above in order to reduce cost relative to the use of higher quantities of ionomer.

For example, in an exemplary embodiment, the inner cover layer may comprise up to 100 weight percent of a non-ionomeric thermoplastic or thermoset material including a thermoplastic polyester polyurethane such as B. F. Goodrich Company's Estane® polyester polyurethane X-4517 or a reaction-injection molded material such as one or more of the Bayflex RIM polyurethanes from Bayer. The non-ionomeric thermoplastic material may be blended with a soft ionomer. For example, polyamides blend well with soft ionomer. According to B. F. Goodrich, Estane® X-451.7 may have the following properties as set forth in Table 26.

TABLE 26

| Properties of Estane ® X-4517 | |
|---|---|
| Tensile | 1430 |
| 100% | 815 |
| 200% | 1024 |
| 300% | 1193 |
| Elongation | 641 |
| Youngs Modulus | 1826 |
| Hardness A/D | 88/39 |
| Bayshore Rebound | 59 |
| Solubility in Water | Insoluble |
| Melt processing temperature | >350° F. (>177° C.) |
| Specific Gravity (H$_2$O = 1) | 1.1–1.3 |

Other soft, relatively low modulus non-ionomeric thermoplastic or thermoset materials may also be used to produce the an exemplary mantle layer as long as the nonionomeric materials produce the playability and durability characteristics desired without adversely affecting the enhanced travel distance characteristic produced by the high acid ionomer resin composition. These include, but are not-limited to thermoplastic polyurethanes such as Texin thermoplastic polyurethanes from Mobay Chemical Co. and the Pellethane thermoplastic polyurethanes from Dow Chemical Co.; non-ionomeric thermoset polyurethanes including but not limited to those disclosed in U.S. Pat. No. 5,334,673; cross-linked metallocene catalyzed polyolefins; ionomer/rubber blends such as those in Spalding U.S. Pat. Nos. 4,986,545; 5,098,105 and 5,187,013; and, styrenebutadiene-styrene block copolymers, including functionalized styrene-butadiene-styrene block copolymers, styreneethylene-butadiene-styrene (SEBS) block copolymers such as KRATON materials from Shell Chemical Co., including functionalized SEBS block copolymers; and, Hytrel polyester elastomers from DuPont and Pebax polyesteramides from Elf Atochem S. A.

Additional Exemplary Outer Cover Layer Materials

While the core with the hard inner cover layer formed thereon, provides the multi-layer golf ball with power and distance, the outer cover layer 8 may be comparatively softer than the inner cover layer. The softness provides for the feel and playability characteristics typically associated with balata or balata-blend balls. The outer cover layer or ply may be comprised of a relatively soft, low modulus (about 1,000 psi to about 10,000 psi) and, in one exemplary embodiment, low acid (less than 16 weight percent acid) ionomer, an ionomer blend, a non-ionomeric thermoplastic or thermosetting material such as, but not limited to, a metallocene catalyzed polyolefin such as EXACT material available from EXXON, a thermoplastic or thermoset polyurethane/polyurea, including castable polyurethanes/polyureas, reaction injection mold-able polyurethanes/polyureas, and injection moldable polyurethanes/polyureas, polycarbonates, thermoplastic block polyesters, such as a polyester elastomer marketed by DuPont under the trademark Hytrel®, thermoplastic block polyamides, such as a polyester amide marketed by Elf Atochem S. A. under the trademark Pebax®, a blend of two or more non-ionomeric thermoplastic or thermosetting materials, or a blend of one or more ionomers and one or more non-ionomeric thermoplastic materials.

The acrylate ester-containing ionic copolymer or copolymers used in the outer cover layer may be obtained by neutralizing commercially available acrylate ester-containing acid copolymers such as polyethylene-methyl acrylate-acrylic acid terpolymers, including ESCOR ATX (Exxon Chemical Company) or poly(ethylene-butyl acrylate-methacrylic acid)terpolymers, including NUCREL (DuPont Chemical Company). Particularly preferred commercially available materials include ATX 320, ATX 325, ATX 310, ATX 350, and blends of these materials with NUCREL 010 and NUCREL 035. The acid groups of these materials and blends are neutralized with one or more of various cation salts including zinc, sodium, magnesium, lithium, potassium, calcium, manganese, nickel, etc. The degree of neutralization ranges from 10–100%. Generally, a higher degree of neutralization results in a harder and tougher cover material. The properties of non-limiting examples of commercially available un-neutralized acid terpolymers which may be used to form the golf ball outer cover layers of the invention are provided below in Table 27.

TABLE 27

Commercially Available Un-Neutralized Acid Terpolymers

| Trade Name | Melt Index dg/min ASTM D 1238 | Acid No. % KOH/g | Flex Modulus Mpa ASTM D790 | Hardness (Shore D) |
|---|---|---|---|---|
| ATX 310 | 6 | 45 | 80 | 44 |
| ATX 320 | 5 | 45 | 50 | 34 |
| ATX 325 | 20 | 45 | 9 | 30 |
| ATX 350 | 6 | 15 | 20 | 28 |
| Nucrel 010 | 11 | 60 | 40 | 40 |
| Nucrel 035 | 35 | 60 | 59 | 40 |

The ionomer resins used to form the outer cover layers may be produced by reacting the acrylate ester-containing acid copolymer with various amounts of the metal cation salts at a temperature above the crystalline melting point of the copolymer, such as a temperature from about 200° F. to about 500° F., preferably from about 250° F. to about 350° F., under high shear conditions at a pressure of from about 1 (x) psi to 10,000 psi. Other well known blending techniques may also be used. The amount of metal cation salt used to produce the neutralized ionic copolymers is the quantity which provides a sufficient amount of the metal cations to neutralize the desired percentage of the carboxylic acid groups in the high acid copolymer. When two or more different copolymers are to be used, the copolymers may be blended before or after neutralization. Generally, it is preferable to blend the copolymers before they are neutralized to provide for optimal mixing. The compatibility of the acrylate ester-containing copolymers with each other in a copolymer blend produces a golf ball outer cover layer may have a surprisingly good scuff resistance for a given hardness of the outer cover layer.

Additional materials may also be added to the inner and outer cover layer as long as they do not substantially reduce the playability properties of the ball. Such materials include dyes (for example, Ultramarine Blue sold by Whitaker, Clark, and Daniels of South Plainsfield, N.J.) (see U.S. Pat. No. 4,679,795), pigments such as titanium dioxide, zinc oxide, barium sulfate and zinc sulfate; UV absorbers; anti-oxidants; antistatic agents; and stabilizers. Moreover, the cover compositions may also contain softening agents such as those disclosed in U.S. Pat. Nos. 5,312,857 and 5,306,760, including plasticizers, metal stearates, processing acids, etc., and rein-forcing materials such as glass fibers and inorganic fillers, as long as the desired properties produced by the golf ball covers of the invention are not impaired.

Soft ionomers primarily are used in formulating the hard/soft blends of the cover compositions. These ionomers include acrylic acid and methacrylic acid based soft ionomers. They are generally characterized as comprising sodium, zinc, or other mono- or divalent metal cation salts of a terpolymer of an olefin may have from about 2 to 8 carbon atoms, methacrylic acid, acrylic acid, or another, a, 13-unsaturated carboxylic acid, and an unsaturated monomer of the acrylate ester class may have from 1 to 21 carbon atoms. The soft ionomer may be made from an acrylic acid base polymer is an unsaturated monomer of the acrylate ester class.

Certain ethylene-acrylic acid based soft ionomer resins developed by the Exxon Corporation under the designation "Iotek 7520" (referred to experimentally by differences in neutralization and melt indexes as I,DX 195, LDX 196, LDX 218 and LDX. 219) may be combined with known hard ionomers such as those indicated above to produce the inner and outer cover layers. The combination produces higher C.O.R.s at equal or softer hardness, higher melt flow (which corresponds to improved, more efficient molding, i.e., fewer rejects) as well as significant cost savings versus the outer layer of multi-layer balls produced by other known hard-soft ionomer-blends as a result of the lower overall raw materials cost and improved yields.

Iotek 7520 resins have Shore D hardnesses of about 32 to 36 (per ASTM D-2240), melt flow indexes of 31–0.5 g/10 min (at 190° C. per ASTM D-1288), and a flexural modulus of about 2500–3500 psi (per ASTM D-790). Furthermore, testing by an independent testing laboratory by pyrolysis mass spectrometry indicates at Iotek 7520 resins are generally zinc salts of a terpolymer of ethylene, acrylic acid, and methyl acrylate.

Furthermore, an acrylic acid based soft ionomer available from the Exxon Corporation under the designation Iotek 7510 is also effective when combined with the hard ionomers indicated above in producing golf ball covers exhibiting higher C.O.R. values at equal or softer hardness than those produced by known hard-soft ionomer blends. In this regard, Iotek 7510 may have the advantages (i.e. improved flow, higher C.O.R. values at equal hardness, increased clarity, etc.) produced by the Iotek 7520 resin when compared to the methacrylic acid base soft ionomers known in the art (such as the Surlyn® 8625 and Surlyn® 8629 combinations disclosed in U.S. Pat. No. 4,884,814).

In addition, Iotek 7510, when compared to Iotek 7520, produces slightly higher C.O.R. values at equal softness/hardness due to the Iotek 7510's higher hardness and neutralization. Similarly, Iotek 7510 produces better release properties (from the mold cavities) due to its slightly higher stiffness and lower flow rate than Iotek 7520. This may be important in production where the soft covered balls tend to have lower yields caused by sticking in the molds and subsequent punched pin marks from the knockouts.

According to Exxon, Iotek 7510 is of similar chemical composition as Iotek 7520 (i.e. a zinc salt of a terpolymer of ethylene, acrylic acid, and methyl acrylate) but is more highly neutralized. Based upon FTIR analysis, Iotek 7520 is estimated to be about 30–40 wt.-% neutralized and Iotek 7510 is estimated to be about 40–60 wt.-% neutralized. The typical properties of Iotek 7510 in comparison of those of Iotek 7520 in comparison of those of Iotek 7520 are set forth below:

TABLE 28

Physical Properties of Iotek 7510 in Comparison to Iotek 7520

| Property | Unit | IOTEK 7520 | IOTEK 7510 |
|---|---|---|---|
| Melt Index | g/10 min. | 2.0 | 0.8 |
| Density | g/cc | 0.96 | 0.97 |
| Melting Point | ° F. | 151 | 149 |
| Vicat softening point | ° F. | 108 | 109 |
| Flex Modulus | psi | 3800 | 5300 |
| Tensile Strength | psi | 1450 | 1750 |
| Elongation | % | 760 | 690 |
| Hardness, Shore D | — | 32 | 35 |

The hard ionomer resins utilized to produce the outer cover layer composition hard/soft blends include ionic copolymers which are the sodium, zinc, magnesium, lithium, etc. salts of the reaction product of an olefin may have from 2 to 8 carbon atoms and an unsaturated monocarboxylic acid may have from 3 to 8 carbon atoms. The carboxylic acid groups of the copolymer may be totally or partially (i.e. approximately 15–75 percent) neutralized.

The hard ionomeric resins are likely copolymers of ethylene and acrylic and/or methacrylic acid, with copolymers of ethylene and acrylic acid being the most preferred. Two or more types of hard ionomeric resins may be blended into the outer cover layer compositions in order to produce the desired properties of the resulting golf balls.

As discussed earlier herein, the hard ionomeric resins introduced under the designation Escor® and sold under the designation "Iotek" are somewhat similar to the hard ionomeric resins sold under the Surlyn® trademark. However, since the "Iotek" ionomeric resins are sodium or zinc salts of poly(ethylene-acrylic acid) and the Surlyn® resins are zinc or sodium salts of poly(ethylene-methacrylic acid) some distinct differences in properties exist. As more specifically indicated in the data set forth below, the hard "Iotek" resins (i.e., the acrylic acid based hard ionomer resins) are the more preferred hard resins for use in formulating the outer layer blends for use in the present invention. In addition, various blends of "Iotek" and Surlyn® hard ionomeric resins, as well as other available ionomeric resins, may be used in the present invention in a similar manner.

Examples of commercially available hard ionomeric resins which may be used in the present invention in formulating the outer cover blends include the hard sodium ionic copolymer sold under the trademark Surlyn® 8940 and the hard zinc ionic copolymer sold under the trademark Surlyn® 9910. Surlyn® 8940 is a copolymer of ethylene with methacrylic acid and about 15 weight percent acid which is about 29 percent neutralized with sodium ions. This resin may have an average melt flow index of about 2.8. Surlyn® 9910 is a copolymer of ethylene and methacrylic acid with about 15 weight percent acid which is about 58 percent neutralized with zinc ions. The average melt flow index of Surlyn® 991-0 is about 0.7. The typical properties of Surlyn® 9910 and 8940, as well as other Surlyn® resins, are set forth below in Tables 29 and 30.

TABLE 29

Representative Properties of Commercially Available Hard Surlyn ® Resins Suitable for Use in the Outer Layer Blends

| | ASTM D | 8940 | 9910 | 8920 | 8528 | 9970 | 9730 | 8150 | 9150 |
|---|---|---|---|---|---|---|---|---|---|
| Cation Type | | Sodium | Zinc | Sodium | Sodium | Zinc | Zinc | Sodium | Zinc |
| Melt flow index/gms/10 min | D-1238 | 2.8 | 0.7 | 0.9 | 1.3 | 14.0 | 1.6 | 4.5 | 4.5 |
| Specific gravity, g/cm³ | D-792 | 0.95 | 0.97 | 0.95 | 0.94 | 0.95 | 0.95 | 0.97 | 0.97 |
| Hardness, Shore D | D-2240 | 65 | 64 | 66 | 60 | 62 | 63 | 65 | 63 |
| Tensile Strength, (kpsi), Mpa | D-638 | (4.8) 33.1 | (3.6) 24.8 | (5.4) 37.2 | (4.2) 29.0 | (3.2) 22.1 | (4.1) 28.3 | (4.5) 31.0 | (4.1) 28.3 |
| Elongation, % | D-638 | 470 | 290 | 350 | 450 | 460 | 460 | 320 | 335 |
| Flexural Modulus, (kpsi) Mpa | D-790 | (51) 350 | (48) 330 | (55) 380 | (32) 220 | (28) 190 | (30) 210 | (71) 490 | (52) 360 |
| Tensile Impact (23° C.) kJ M₂(ft.-lbs./in²) | D-1822S | 1020 (485) | 1020 (485) | 865 (410) | 1160 (550) | 760 (360) | 1240 (590) | — | — |
| Vicat, Temperature, ° C. | D-1525 | 63 | 62 | 58 | 73 | 61 | 73 | 53 | 57 |

TABLE 30

Representative Properties of Additional Hard Surlyn ® Resins

| IONOMER | | SURLYN ® 8920 | SURLYN ® 8140 | SURLYN ® 9120 |
|---|---|---|---|---|
| Cation | | Na | Na | Zn |
| Melt Flow Index | gm/10 min | 0.9 | 2.6 | 1.3 |
| MP | ° C. | 84 | 88 | 85 |
| FP | ° C. | 52 | 49 | 50 |
| Tensile Strength | kpsi | 5.4 | 5.0 | 38 |
| Yield Strength | kpsi | 2.2 | 28 | 2.4 |
| Elongation | % | 350 | 340 | 280 |
| Flex Modulus | kpsi | 55 | 71 | 64 |
| Shore D Hardness | | 66 | 70 | 69 |

Examples of the more pertinent acrylic acid based hard ionomer resin suitable for use in the cover compositions sold under the "Iotek" tradename by the Exxon Corporation include Iotek, but are not limited to, 8000, 8010, 8020, 8030, 7030, 7010, 7020, EX 1001–1009, Iotek 959 and Iotek 960, as well as the materials listed above on Tables 2 and 3. The typical properties of the remainder of these and other Iotek ionomers suited for use in formulating the cover compositions are set forth below in Tables 31 and 32.

TABLE 31

Representative Typical Properties of Iotek Ionomers

| Resin Properties | ASTM Method | Units | 7010 | 7020 | 7030 | 8000 | 8020 | 8030 |
|---|---|---|---|---|---|---|---|---|
| Cation type | | | zinc | zinc | zinc | sodium | sodium | sodium |
| Melt index | D-1238 | g/10 min. | 0.8 | 1.5 | 2.5 | 0.8 | 1.6 | 2.8 |
| Density | D-1505 | kg/m³ | 968 | 966 | 954 | 957 | 956 | 956 |
| Melting Point | D-3417 | ° C. | 83.5 | 84 | 85 | 83 | 84 | 87 |
| Crystallization Point | D-3417 | ° C. | 55 | 56 | 58 | 45 | 47 | 49 |
| Vicat Softening Point | D-1525 | ° C. | 60 | 60 | 60 | 54 | 54.5 | 55.5 |
| Tensile strength at break | D-638 | MPA | 24.5 | 23.5 | 22.6 | 33 | 32.5 | 32 |
| Yield Strength | D-638 | MPA | 14 | 13 | 12 | 19 | 18.5 | 18 |
| Elongation at break | D-638 | % | 440 | 450 | 460 | 370 | 380 | 410 |
| 1% Secant modulus | D-638 | MPA | 150 | 135 | 125 | 280 | 280 | 280 |
| Shore Hardness D | D-2240 | — | 54 | 53 | 52 | 60 | 60 | 60 |
| Flex modulus (3 mm) | D-790 | MPA | 190 | 175 | 155 | 320 | 340 | 355 |

TABLE 32

Representative Examples of Exxon High Molecular Weight Ionomers

| PROPERTY | Ex 1005 | Ex 1006 | Ex 1007 | Ex 1008 | Ex 1009 | 7310 |
|---|---|---|---|---|---|---|
| Melt index, g/10 min. | 0.7 | 1.3 | 1.0 | 1.4 | 0.8 | 1.0 |
| Cation | Na | Na | Zn | Zn | Na | Zn |
| Melting Point, ° C. | 85.3 | 86 | 85.8 | 86 | 91.3 | 91 |
| Vicat Softening Point, ° C. | 54 | 57 | 60.5 | 60 | 56 | 69 |
| Tensile @ Break, MPA | 33.9 | 33.5 | 24.1 | 23.6 | 32.4 | 24 |
| Elongation @ Break, % | 403 | 421 | 472 | 427 | 473 | 520 |
| Hardness, Shore D | 58 | 58 | 51 | 50 | 56 | 52 |
| Flexural Modulus, MPa | 289 | 290 | 152 | 141 | 282 | 150 |

It has been determined that when hard/soft ionomer blends are used for the outer cover layer, good results are produced when the relative combination is in a range of about 3–25 percent hard ionomer and about 75–97 percent soft ionomer.

Moreover, in alternative exemplary embodiments, the inner and/or outer cover layer formulation may also comprise up to 100 wt % of a non-ionomeric thermoplastic or thermoset material including a polyester polyurethane such as B. F. Goodrich Company's thermoplastic Estane® polyester polyurethane X-4517 or a reaction-injection molded material such as one or more of the Bayflex RIM polyurethanes from Bayer. The non-ionomeric thermoplastic material may be blended with a soft ionomer. For example, polyamides blend well with soft ionomer. The properties for Estane® X-4517 were previously noted.

Additional Exemplary Filler Materials

In an exemplary embodiment of the invention, at least one layer of the golf ball contains at least 0.01 parts by weight of a filler. Fillers may be used to adjust the density, flex modulus, mold release, and/or melt flow index of a layer. For example when a filler is used to adjust the density or flex modulus of a layer, it may be present in an amount of at least five parts by weight based upon 100 parts by weight of the layer composition.

A density adjusting filler is a filler which has a specific gravity which is at least 0.05 and preferably has a specific gravity at least 0.1 higher or lower than the specific gravity of the layer composition. Particularly preferred density adjusting fillers have specific gravities which are higher than the specific gravity of the resin composition by 0.2 or more, even more preferably by 2.0 or more.

A flex modulus adjusting filler is a filler which, when used in amount of e.g. 1–100 parts by weight based upon 100 parts by weight of resin composition, will raise or lower the flex modulus (ASTM D-790) of the resin composition by at least 1% and preferably at least 5% as compared to the flex modulus of the resin composition without the inclusion of the flex modulus adjusting filler.

A mold release adjusting filler is a filler which allows for the easier removal of a part from a mold, and eliminates or reduces the need for external release agents which otherwise could be applied to the mold. A mold release adjusting filler typically is used in an amount of up to about 2 wt % based upon the total weight of the layer.

A melt flow index adjusting filler is a filler which may be used to increase or decrease the melt flow, or ease of processing of the composition.

The layers may contain coupling agents that increase adhesion of materials within a particular layer e.g. to couple a filler to a resin composition, or between adjacent layers. Non-limiting examples of coupling agents include titanates, zirconates and silanes. Coupling agents typically are used in amounts of 0.1–2 wt % based upon the total weight of the composition in which the coupling agent is included.

A density adjusting filler may be used to control the moment of inertia, and thus the initial spin rate of the ball and spin decay. The addition in one or more layers, and particularly in the outer cover layer of a filler with a lower specific gravity than the resin composition results in a decrease in moment of inertia and a higher initial spin rate than would result if no filler were used. The addition in one or more of the cover layers, and particularly in the outer cover layer of a filler with a higher specific gravity than the resin composition, results in an increase in moment of inertia and a lower initial spin rate. High specific gravity fillers are preferred as less volume is used to produce the desired inner over total weight. Non-reinforcing fillers are also preferred as they have minimal effect on COR. Preferably, a filler does not chemically react with the resin composition to a substantial degree, although some reaction may occur when, for example, zinc oxide is used in a shell layer which contains some ionomer.

The density-increasing fillers for use in the invention preferably have a specific gravity in the range of 1.0–20. The density-reducing fillers for use in the invention preferably have a specific gravity of 0.06–1.4, and more preferably 0.06–0.90. The flex modulus increasing fillers have a reinforcing or stiffening effect due to their morphology, their interaction with the resin, or their inherent physical properties. The flex modulus reducing fillers have an opposite effect due to their relatively flexible properties compared to the matrix resin. The melt flow index increasing fillers have a flow enhancing effect due to their relatively high melt flow versus the matrix. The melt flow index decreasing fillers have an opposite effect due to their relatively low melt flow index versus the matrix.

Fillers which may be employed in layers other than the outer cover layer may be or are typically in a finely divided form, for example, in a size generally less than about 20 mesh, preferably less than about 100 mesh U.S. standard size, except for fibers and flock, which are generally elongated. Flock and fiber sizes should be small enough to facilitate processing. Filler particle size will depend upon desired effect, cost, ease of addition, and dusting considerations. The filler preferably is selected from the group consisting of precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates, metals, metal alloys, tungsten carbide, metal oxides, metal stearates, particulate carbonaceous materials, micro balloons, and combinations thereof. Non-limiting examples of suitable fillers, their densities, and their preferred uses are as follows in Table 33.

TABLE 33

Exemplary Filler Materials

| Filler Type | Specific Gravity | Comments |
| --- | --- | --- |
| Precipitated hydrated silica | 2.0 | 1, 2 |
| Clay | 2.62 | 1, 2 |
| Talc | 2.85 | 1, 2 |
| Asbestos | 2.5 | 1, 2 |
| Glass fibers | 2.55 | 1, 2 |
| Aramid fibers (KEVLAR ®) | 1.44 | 1, 2 |
| Mica | 2.8 | 1, 2 |
| Calcium metasilicate | 2.9 | 1, 2 |
| Barium sulfate | 4.6 | 1, 2 |
| Zinc sulfate | 4.1 | 1, 2 |
| Lithopone | 4.2–4.3 | 1, 2 |
| Silicates | 2.1 | 1, 2 |
| Silicon carbide platelets | 3.18 | 1, 2 |
| Silicon carbide whiskers | 3.2 | 1, 2 |
| Tungsten carbide | 15.6 | 1 |
| Diatomaceous earth | 2.3 | 1, 2 |
| Polyvinyl chloride | 1.41 | 1, 2 |
| Carbonates | | |
| Calcium carbonate | 2.71 | 1, 2 |
| Magnesium carbonate | 2.20 | 1, 2 |
| Metals and Alloys (powders) | | |
| Titanium | 4.51 | 1 |
| Tungsten | 19.35 | 1 |
| Aluminum | 2.70 | |
| Bismuth | 9.78 | 1 |
| Nickel | 8.90 | 1 |
| Molybdenum | 10.2 | 1 |
| Iron | 7.86 | 1 |
| Steel | 7.8–7.9 | 1 |
| Lead | 11.4 | 1, 2 |
| Copper | 8.94 | 1 |
| Brass | 8.2–8.4 | 1 |
| Boron | 2.34 | 1 |
| Boron carbide whiskers | 2.52 | 1, 2 |
| Bronze | 8.70–8.74 | 1 |
| Cobalt | 8.92 | 1 |
| Beryllium | 1.84 | 1 |
| Zinc | 7.14 | 1 |
| Tin | 7.31 | 1 |

TABLE 33-continued

Exemplary Filler Materials

| Filler Type | Specific Gravity | Comments |
| --- | --- | --- |
| Metal Oxides | | |
| Zinc oxide | 5.57 | 1, 2 |
| Iron oxide | 5.1 | 1, 2 |
| Aluminum oxide | 4.0 | |
| Titanium oxide | 3.9–4.1 | 1, 2 |
| Magnesium oxide | 3.3–3.5 | 1, 2 |
| Zirconium oxide | 5.73 | 1, 2 |
| Metal Stearates | | |
| Zinc Stearate | 1.09 | 3, 4 |
| Calcium stearate | 1.03 | 3, 4 |
| Barium stearate | 1.23 | 3, 4 |
| Lithium stearate | 1.01 | 3, 4 |
| Magnesium stearate | 1.03 | 3, 4 |
| Particulate carbonaceous materials | | |
| Graphite | 1.5–1.8 | 1, 2 |
| Carbon black | 1.8 | 1, 2 |
| Natural bitumen | 1.2–1.4 | 1, 2 |
| Cotton flock | 1.3–1.4 | 1, 2 |
| Cellulose flock | 1.15–1.5 | 1, 2 |
| Leather fiber | | |
| Micro balloons | 1.2–1.4 | 1, 2 |
| Glass | 0.15–1.1 | 1, 2 |
| Ceramic | 0.2–0.7 | 1, 2 |
| Fly ash | 0.6–0.8 | 1, 2 |
| Coupling Agents Adhesion Promoters | | |
| Titanates | 0.95–1.17 | |
| Zirconates | 0.92–1.11 | |
| Silane | 0.95–1.2 | |

COMMENTS:
1 Particularly useful for adjusting density of the cover layer.
2 Particularly useful for adjusting flex modules of the cover layer.
3 Particularly useful for adjusting mold release of the cover layer.
4 Particularly useful for increasing melt flow index of the cover layer.

All fillers except for metal stearates would be expected to reduce the melt flow index of the cover layer. The amount of filler employed is primarily a function of weight requirements and distribution. Generally, lesser amounts of high specific gravity materials are necessary to produce an increase in the moment of inertia in comparison to low specific gravity materials. Furthermore, handling and processing conditions can also effect the type of heavy weight filler material incorporated into cover layers.

From the foregoing description it will be appreciated that the present invention includes novel golf ball component/layer compositions and configurations and novel combinations of such components/layers to produce novel multi-layer golf balls.

Having described preferred golf ball component/layer exemplary embodiments and preferred combinations of such components/layers to produce preferred multi-layer golf ball configurations, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. A golf ball, comprising:
a core;
a mantle layer disposed over the core; and
a thermoset cover further disposed over the mantle layer produced by the combination including:
at least one dilsocyanate;
at least one polyol;
a carbamic acid formed by the reaction of the at least one diisocyanate and the polyol with an NCO% content between about 4.0 to 6.0%; and
a curative blended with the carbamic acid to form the golf ball cover when cured, wherein a hard-segment ratio of about 0.9 to 5 is formed between the polyol and the curative.

2. The golf ball of claim 1, wherein the core has a compression of about 68 to 75 PGA.

3. The golf ball of claim 1, wherein the mantle has a hardness of about 60 to 62 shore D.

4. The golf bal of claim 1, wherein the mantle has a thickness of about 0.050 inches.

5. The golf ball of claim 1, wherein the core has a coefficient of restitution of about 0.690 or greater.

6. The golf ball of claim 1, wherein the cover has a hardness of about 45 to 55 Shore D.

7. The golf ball of claim 1, wherein the core has a heavy filler which is less than 2% of the volume of the core.

8. The golf ball of claim 1, wherein the mantle layer has a heavy filer that is less than 2% of the volume of the mantle.

9. A golf ball, comprising:
a core;
a mantle disposed over the core; and
a thermoset cover disposed over the mantle produced by the combination including:
at least one diisocyanate selected from the group consisting of PPDI, CHDI, NDI, TOl, TODI, MDI and combinations thereof;
at least one polyol selected from the group consisting of Adipic Acid Based polyols, Amine Terminated Polyols, Caprolactone Based polyols, Hexanoic Acid Based polyols, Maleic Acid Based polyols, Monol based polyols, Ophthalmic Acid Based polyols, PEG-Based polyols, Polyether based polyols, demonized fatty acids based polyols, hydroxyl-functional saturated and unsaturated polyethylene based polyols, hyd roxy-fu nctional polybutadiene based polyols, polyethers esters, polytetramethylene glycol ethers and combinations thereof;
a carbamic acid formed by the reaction of the at least one diisocyanate and the polyol with an NCO% content between about 4.0 to 6.0%; and
a curative blended with the carbamic acid to form the golf ball cover when cured, wherein a hard segment ratio of about 0.9 to 5 is formed between the polyol and the curative.

10. The golf ball cover of claim 9, wherein the polyol selected has a molecular number weight average weight of about 800 to 4,000.

11. The golf ball cover of claim 9, wherein the poly dispersity index (PDI) of the polyol is about 3 to 8.

12. The golf ball cover of claim 9, wherein the curative has a molecular weight number average of about 60 to 600.

13. A golf ball cover, comprising:
a thermoset cover produced by the combination including:
at least one diisocyanate selected from the group consisting of PPDI, CHDI, NDI, TDI, TODI, MDI and combinations thereof;
at least one polyol selected from the group consisting of Adipic Acid Based polyols, Amine Terminated Polyols, Caprolactone Based polyols, Hexanoic Acid Based polyols, Maleic Acid Based polyols, Monol based polyols, Phthalic Acid Based polyols, PEG-Based polyols, Polyester based polyols, PPG based polyols, PTMEG based polyols, Terephthalic Acid Based polyols, Polyether based polyols dimerized fatty acids based polyols, hydroxy-functional saturated and unsaturated polyethylene based polyols, hydroxy-functional polybutad iene based polyols, polyethers esters, polytetramethylene glycol ethers and combinations thereof;
a carbamic acid formed by the reaction of the at least one diisocyanate and the polyol with an NCO% content between about 4.0 to 6.0%; and
at least one curative blended with the carbamic acid to form the golf bal cover when cured, wherein a hard segment ratio of about 0.9 to 5 is formed between the polyol and wherein the curative is selected from the group consisting of ethylene glycol, 1,4-butendiol (1,4-BD or BDO), 1,6-hexanediol, bis-(hydroxyethyl), hydroqinone (HQEE), 1,4-cyclohaxanedimenthol (CHDM), glycerol, 1,3-propanediol, trimethylol propane (TMP), ethylene diamine, toluene diamine (TDA), diamineodiphenylmethane (MDA), 3,3'-dicholoro-4,4'-diamino-diphenylmethane (MB-OCA), 3,5-d iamno-4-chloro-benzoat, diethyltoluene diamine (DETDA), trimethylene glycol di-p-aminobenzoate (TMAB), 4,4'-methylenebis(3-chloro-2,6-diethylaniline (M-CDEA), 3,5-dimetylthio-2,4-toluenediamine, 3,5-dimethylthio-2,6-toluenediamine and combinations thereof.

14. The golf ball of claim 13, wherein the polyol selected has a molecular number weight average weight of about 800–4,000.

15. The golf ball of claim 13, wherein the poly dispersity index (PDI) of the polyol is about 3 to 8.

* * * * *